United States Patent [19]

Kuroki et al.

[11] Patent Number: 5,802,453

[45] Date of Patent: Sep. 1, 1998

[54] RADIO PAGING TRANSMITTER WHICH ADJUSTS ITS TRANSMISSION TIME BASED ON DETECTION OF ITS OWN TRANSMISSION DELAY

[75] Inventors: Yoshinori Kuroki; Toshiro Suzuki; Ayumu Koide; Takafumi Kojima; Yasuo Kogure, all of Yokohama, Japan

[73] Assignee: Hitachi, Ltd., Tokyo, Japan

[21] Appl. No.: 566,434

[22] Filed: Nov. 30, 1995

[30] Foreign Application Priority Data

Dec. 2, 1994 [JP] Japan ................................. 6-299242

[51] Int. Cl.$^6$ ................................................. H04M 11/00
[52] U.S. Cl. ...................... 455/31.2; 455/13.2; 340/825.2
[58] Field of Search ............................ 379/57, 59, 60; 455/31.2, 51.2, 54.1, 67.1, 69, 13.2, 448, 426, 458, 115, 88; 340/825.47, 825.14, 825.24, 825.44, 825.2

[56] References Cited

U.S. PATENT DOCUMENTS

| 5,201,061 | 4/1993 | Goldberg et al. | 455/67.1 X |
| 5,220,676 | 6/1993 | LoGalbo et al. | 455/13.2 X |
| 5,257,404 | 10/1993 | Goreham et al. | 455/69 X |
| 5,285,443 | 2/1994 | Patsiokas et al. | 455/88 X |
| 5,327,581 | 7/1994 | Goldberg et al. | 455/67.1 X |
| 5,355,529 | 10/1994 | Linquist et al. | 455/13.2 X |
| 5,402,424 | 3/1995 | Kou | 455/13.2 X |
| 5,473,638 | 12/1995 | Marchetto et al. | 375/356 |
| 5,481,258 | 1/1996 | Fawcett et al. | 340/825.47 |
| 5,497,339 | 3/1996 | Bernard | 364/705.05 |
| 5,506,863 | 4/1996 | Meidan et al. | 375/202 |
| 5,506,886 | 4/1996 | Maine et al. | 379/57 |
| 5,507,014 | 4/1996 | Wray et al. | 455/115 |
| 5,510,797 | 4/1996 | Abraham et al. | 342/352 |
| 5,521,887 | 5/1996 | Loomis | 368/47 |
| 5,528,248 | 6/1996 | Steiner et al. | 342/357 |
| 5,561,701 | 10/1996 | Ichinkawa | 455/31.2 |
| 5,564,084 | 10/1996 | Hirasawa | 455/115 |
| 5,621,118 | 4/1997 | Vanderspool, II et al. | 455/69 X |

FOREIGN PATENT DOCUMENTS

| 0551126A1 | 7/1993 | European Pat. Off. . |
| 2271248 | 4/1994 | United Kingdom . |
| WO 92/11707 | 7/1992 | WIPO . |
| WO 92/13417 | 8/1992 | WIPO . |

Primary Examiner—David R. Hudspeth
Assistant Examiner—Scott Richardson
Attorney, Agent, or Firm—Antonelli, Terry, Stout & Kraus, LLP

[57] ABSTRACT

In a radio paging system and a radio paging method, in which all transmitters are simply synchronized with each other with a satisfactory precision. A central exchange and each transmitter are each provided with a GPS clock for measuring time according to a current time transmitted from the GPS clock. An encoder of the central exchange adds to a message received from a network a real time, which is information to specify time to send the message from each transmitter, according to the current time measured by the GPS clock thereof and then distributes the message to the transmitters. A synchronizing section of each transmitter sends from a transmitting unit the message distributed from the central exchange to a receiver at a time specified by the real time added to the message according to the current time measured by the GPS clock thereof.

3 Claims, 23 Drawing Sheets

FIG.3

| | 1 2 3 4 5 6 7 • • • • • • • • • • • 21 | 22 • • • • • • 31 | 32 |
|---|---|---|---|
| | INFORMATION BITS | CHECK BITS | EREN PARITY |
| WORD 0 | i i i i i i i i i i i i i i i i i i i i i | ppppppppppp | p |
| WORD 1 | i i i i i i i i i i i i i i i i i i i i i | ppppppppppp | p |
| WORD 2 | i i i i i i i i i i i i i i i i i i i i i | ppppppppppp | p |
| WORD 3 | i i i i i i i i i i i i i i i i i i i i i | ppppppppppp | p |
| WORD 4 | i i i i i i i i i i i i i i i i i i i i i | ppppppppppp | p |
| ⋮ | ⋮ | ⋮ | ⋮ |
| WORD 5 | i i i i i i i i i i i i i i i i i i i i i | ppppppppppp | p |

FIG.4

| | 1 2 3 4 5 6 7 • • • • • • • • • • • 21 | 22 • • • • • • 31 | 32 |
|---|---|---|---|
| | INFORMATION BITS | CHECK BITS | EREN PARITY |
| WORD 0a | i i i i i i i i i i i i i i i i i i i i i | ppppppppppp | p |
| WORD 0c | i i i i i i i i i i i i i i i i i i i i i | ppppppppppp | p |
| WORD 1a | i i i i i i i i i i i i i i i i i i i i i | ppppppppppp | p |
| WORD 1c | i i i i i i i i i i i i i i i i i i i i i | ppppppppppp | p |
| ⋮ | ⋮ | ⋮ | ⋮ |
| WORD 6a | i i i i i i i i i i i i i i i i i i i i i | ppppppppppp | p |
| WORD 6c | i i i i i i i i i i i i i i i i i i i i i | ppppppppppp | p |
| WORD 7a | i i i i i i i i i i i i i i i i i i i i i | ppppppppppp | p |
| WORD 7c | i i i i i i i i i i i i i i i i i i i i i | ppppppppppp | p |

FIG.5

| | 1 2 3 4 5 6 7 • • • • • • • • • • • • • 21 | 22 • • • • • • • 31 | 32 |
|---|---|---|---|
| | INFORMATION BITS | CHECK BITS | EREN PARITY |
| WORD 0a | i i i i i i i i i i i i i i i i i i i i i | p p p p p p p p p p | p |
| WORD 0b | i i i i i i i i i i i i i i i i i i i i i | p p p p p p p p p p | p |
| WORD 0c | i i i i i i i i i i i i i i i i i i i i i | p p p p p p p p p p | p |
| WORD 0d | i i i i i i i i i i i i i i i i i i i i i | p p p p p p p p p p | p |
| WORD 1a | i i i i i i i i i i i i i i i i i i i i i | p p p p p p p p p p | p |
| ⋮ | ⋮ | ⋮ | ⋮ |
| WORD 6d | i i i i i i i i i i i i i i i i i i i i i | p p p p p p p p p p | p |
| WORD 7a | i i i i i i i i i i i i i i i i i i i i i | p p p p p p p p p p | p |
| WORD 7b | i i i i i i i i i i i i i i i i i i i i i | p p p p p p p p p p | p |
| WORD 7c | i i i i i i i i i i i i i i i i i i i i i | p p p p p p p p p p | p |
| WORD 7d | i i i i i i i i i i i i i i i i i i i i i | p p p p p p p p p p | p |

FIG.6

| BI | AF | VF | MF | IB |
|---|---|---|---|---|

FIG.7

| FLAG | EXCHANGE FRAME LENGTH | CYCLE NO. | FRAME NO. | FREQUENCY CHANNEL | OTHER INFORMATION | MESSAGE INFORMATION | CRC | FLAG |

FIG.15
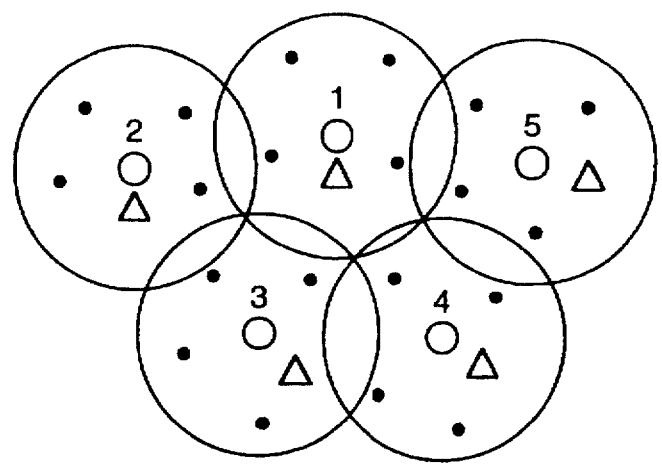
○ POSITION OF REFERENCE STATION
△ POSITION OF STANDBY REFERENCE STATION
• POSITION OF TRANSMITTER
HIERARCHY
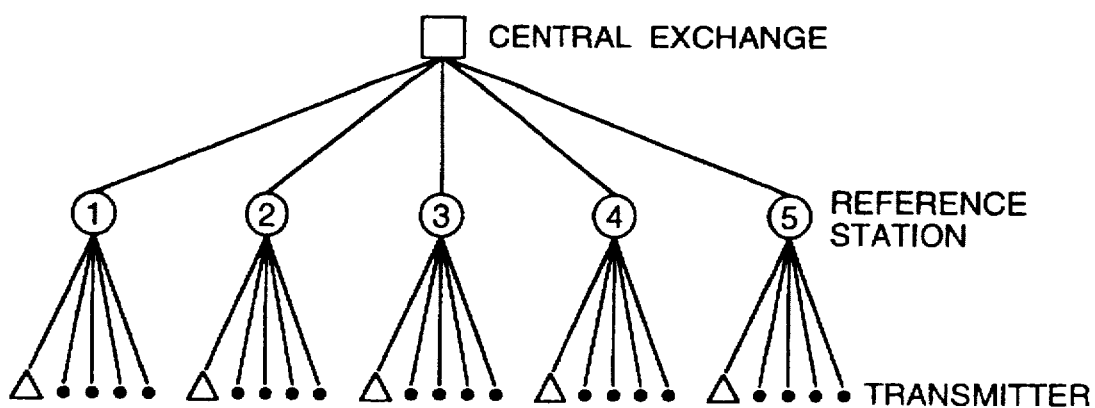

FIG.16
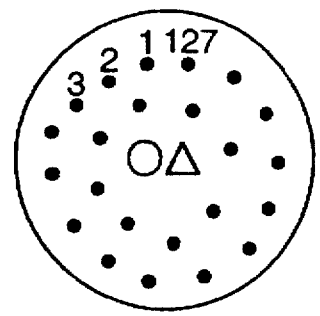
○ POSITION OF REFERENCE STATION
△ POSITION OF STANDBY REFERENCE STATION
• POSITION OF TRANSMITTER
HIERARCHY
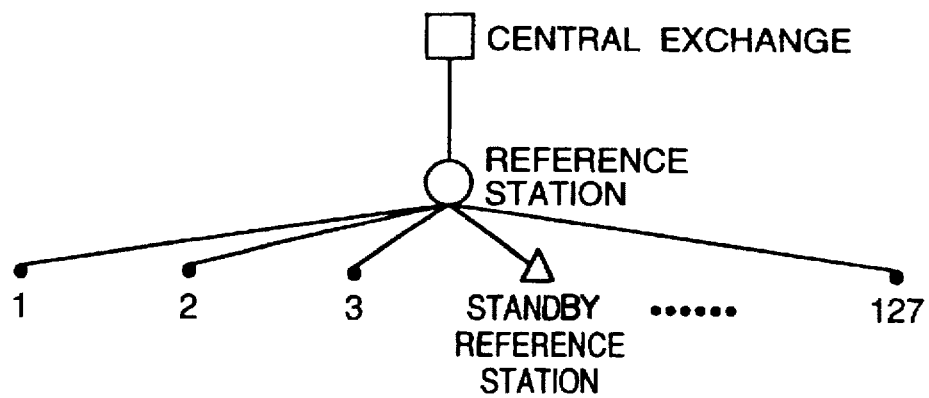

RADIO PAGING TRANSMITTER WHICH ADJUSTS ITS TRANSMISSION TIME BASED ON DETECTION OF ITS OWN TRANSMISSION DELAY

BACKGROUND OF THE INVENTION

The present invention relates to a radio paging system in which a message is sent from a telephone unit or the like via a public or leased network to a portable radio receiving or paging unit.

There has been realized a radio paging system in which a message is sent from a telephone unit or the like via a leased line to a portable radio paging unit broadly utilized and known as a nickname such as "pocket bell".

Such a radio paging system can be implemented by the configuration shown, for example, in FIG. 25.

In FIG. 25, reference numeral 1 indicates a central exchange, numerals 2 and 3 denote transmitters, numeral 4 designates a receiver or receiving unit, numeral 5 stands for a network, and numeral 6 represents a telephone terminal (subscriber) unit.

A message transmitted from the terminal 6 to either one of the receivers 4 is sent via the network 5 to the central exchange 1. The exchange transmits the message to all transmitters 2 and 3. Each of the transmitters 2 and 3 then broadcasts the message by radio. Each receiver 4 receives the messages sent from the transmitters 2 and 3 existing in a radio receiving range. When the message is destined thereto, the receiver presents the contents of the message on a display or the like thereof.

As above, according to the method in which a call to a certain receiver is transmitted from all transmitters, it is unnecessary for the network system (a network, a known station 1, and transmitters 2 and 3) to achieve, for example, a control operation to check whether or not each receiver is within a range of transmission. Additionally, each receiver 4 is not required to be provided with a transmitting function to notify its position to the network side. Therefore, the radio paging system can be materialized in a simple configuration.

On the other hand, according to the method above, each receiver 4 receives radio waves transmitted from the plural transmitters 2 and 3. That is, in each receiver 4, the radio waves transmitted from the plural transmitters 2 and 3 interfere with each other. Consequently, for each receiver 4 to appropriately achieve the wave reception also when there exists such interference, it is necessary to synchronize all transmitters 2 and 3 so as to transmit the same contents therefrom at almost the same point of time.

In this situation, there can be considered, for example, the following method of synchronizing all transmitters 2 and 3.

That is, one of the transmitters 2 and 3 is first set as a reference station or transmitter. The transmitter 3 is assigned as the reference station in this case. Furthermore, there is first measured a transmission delay time between the reference station 3 and each transmitter 2. Thereafter, the time of a clock provided in the reference station 3 is sent via a radio transmission. In each transmitter 2, the clock thereof is set to that of the reference station according to the time and the delay time beforehand obtained.

On the other hand, the central exchange 1 adds to each message an information item specifying a point of time at which the message is to be sent and then sends the message to the transmitters 2 and 3. Each of the transmitters 2 and 3 transmits the message at the specified time according to the own clock.

SUMMARY OF THE INVENTION

In accordance with the method of synchronizing all transmitters 2 and 3 as described above, it is necessary to first measure the transmission delay time between the reference station and each transmitter 2 so as to set the delay time to each transmitter 2. However, the measurement is difficult due to a high precision required therefor and increases the burden of job when the transmitters 2 are installed.

In addition, in case when one reference station is arranged in the system, some transmitters 2 cannot receive radio waves therefrom under some geographical conditions or the like, it is required to provide a plurality of reference stations. In this situation, it is further necessary to adjust time between the reference stations and the transmitters and hence the work burden is additionally increased in the setup operation of the radio paging system. Moreover, it is difficult to attain the high precision.

Furthermore, according to the above method, when a failure occurs in the reference station, the overall radio paging system is set to a state in which the normal operation is impossible, leading to a problem of reliability.

It is therefore an object of the present invention to provide a radio paging system capable of synchronizing all transmitters in a more simplified fashion with a satisfactory precision.

To achieve the above object, there is provided according to the present invention a radio paging system in which a message is transmitted, for example, to a plurality of receivers by radio, comprising a plurality of transmitters for transmitting the message by radio and a central exchange connected to a network for distributing a message received from the network to the plural transmitters. The central exchange and each of the transmitters each includes a satellite receiving unit for receiving information of time transmitted from a satellite by radio and a satellite clock for measuring a current time according to the information of time received by the satellite receiving unit. The central exchange further includes means for adding, according to the current time being measured by the satellite clock thereof, transmission time information to the message received from the network, the information specifying a point of time at which the message is to be transmitted from the transmitter and distributing means for distributing to each of the transmitters the message to which the transmission time information is added. Each of the transmitters includes receiving means for receiving the message distributed from the central exchange, a receiver transmitting unit for transmitting a message by radio, and control means for transmitting, according to the current time being measured by the satellite clock thereof, the message from the receiver transmitting unit at a point of time specified by the time information added to the message received by the receiving means.

In the radio paging system according the present invention, information of time transmitted from a satellite by radio is received respectively by the central exchange and the plural transmitters and the current time is measured according to the received time information. According to the current time being measured, each transmitter then sends to the receivers the message received from the central exchange.

On this occasion, it can be assumed that the delay in time of the radio transmission from the central exchange to each of the transmitters is the same if the ordinary arrangement of the central exchange and the transmitters is not excessively expanded. In consequence, each transmitter can transmit the message, which has been received from the central station, to the receivers almost at the same time according to the current time being measured.

BRIEF DESCRIPTION OF THE DRAWINGS

These and other objects and advantages of the present invention will become apparent by reference to the following description and accompanying drawings wherein:

FIG. 3 is a diagram showing correspondences between constitution of words contained in blocks of air frames and phases;

FIG. 4 is a diagram showing correspondences between constitution of words contained in blocks of air frames and phases;

FIG. 5 is a diagram showing correspondences between constitution of words contained in blocks of air frames and phases;

FIG. 6 is a diagrams showing the configuration of a communication frame including words of one phase contained in blocks of air frames;

FIG. 7 is a diagram showing the construction of an embodiment of a switchboard frame according to the present invention;

FIG. 15 is a diagram showing arrangement of reference stations and standby reference stations in the embodiment according to the present invention;

FIG. 16 is a diagram showing arrangement of reference stations and standby reference stations in the embodiment of the present invention;

DESCRIPTION OF THE PREFERRED EMBODIMENTS

Next, description will be given of an embodiment of a radio paging system according to the present invention.

Figure 1:
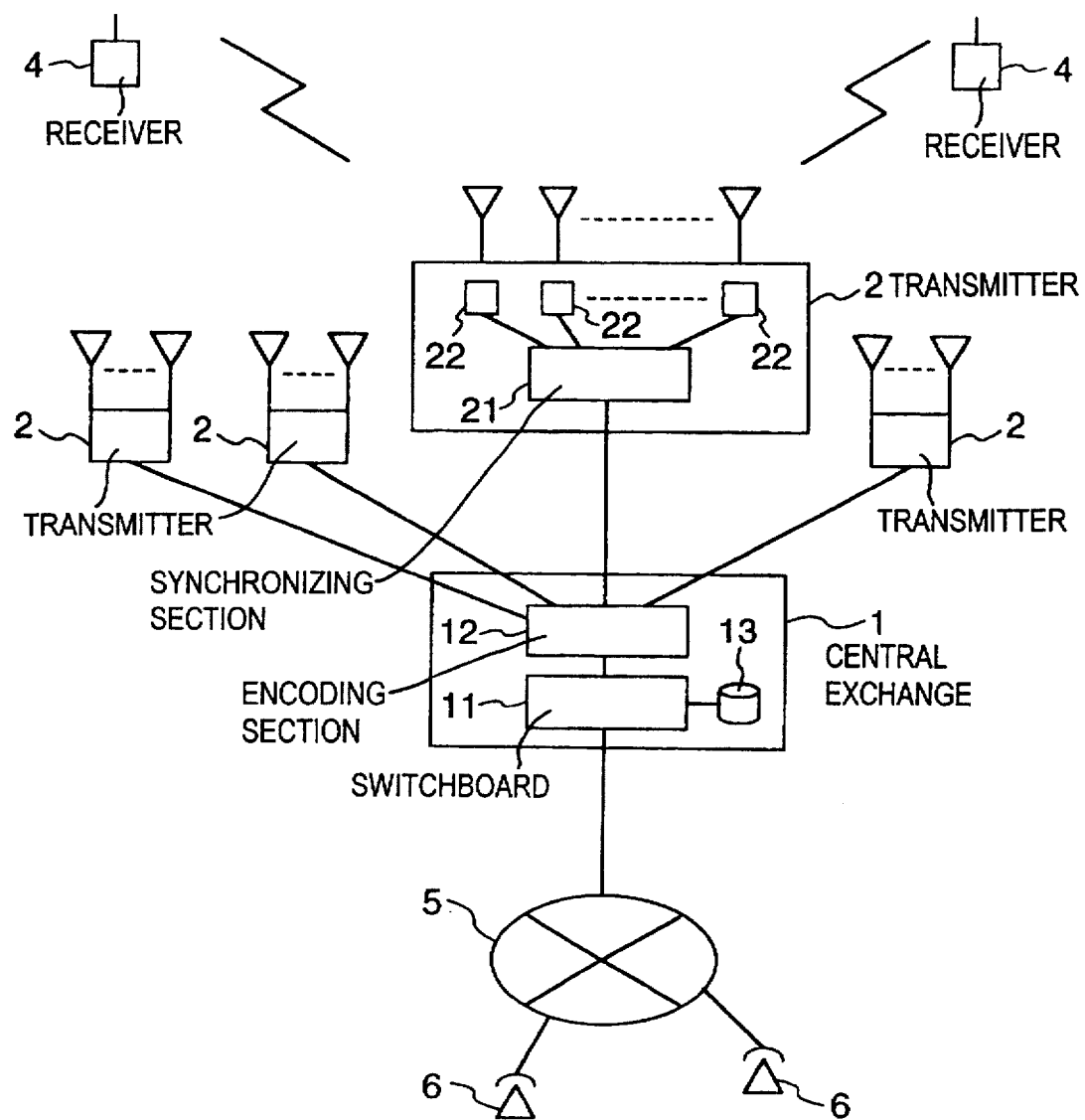
FIG. 1 is a block diagram showing structure of an embodiment of a radio paging system according to the present invention.

FIG. 1 shows the construction of a radio paging system in accordance with the present invention.

In the configuration, reference numeral 1 indicates a central exchange, numeral 2 denotes a transmitter, numeral 4 stands for a receiver, numeral 5 represents a network, and numeral 6 indicates a telephone unit or terminal.

The central exchange 1 is linked with each transmitter 2 via a dedicated digital line, a leased digital line, an analog line (modem line), or the like. Furthermore, the transmitters 2 are connected to the receivers 4 via radio transmission paths. Each radio transmission path includes a plurality of frequency channels such that a plurality of radio communication lines are formed on each frequency channel. Each receiver 4 receives a message sent from a particular radio circuit or line.

In the structure above, a message transmitted from the telephone terminal 6 to either one of the receivers 4 is sent via the network 5 to the central exchange 1. The exchange 1 passes the message to all transmitters 2. The respective transmitters 2 are synchronized with each other and broadcast the message, which are received from the exchange 1, almost at the same time to the destination via a radio line associated therewith. Each receiver 4 receives the message sent from the transmitter 2 in a radio wave receiving range. When the message is destined thereto, the receiver 4 presents the contents of the message on a display or the like provided in the receiver 4.

Subsequently, description will be given in detail of the radio paging system according the present invention.

First, description will be given of the format of air frames transmitted via the frequency channels from the transmitters 2.

Figure 2:
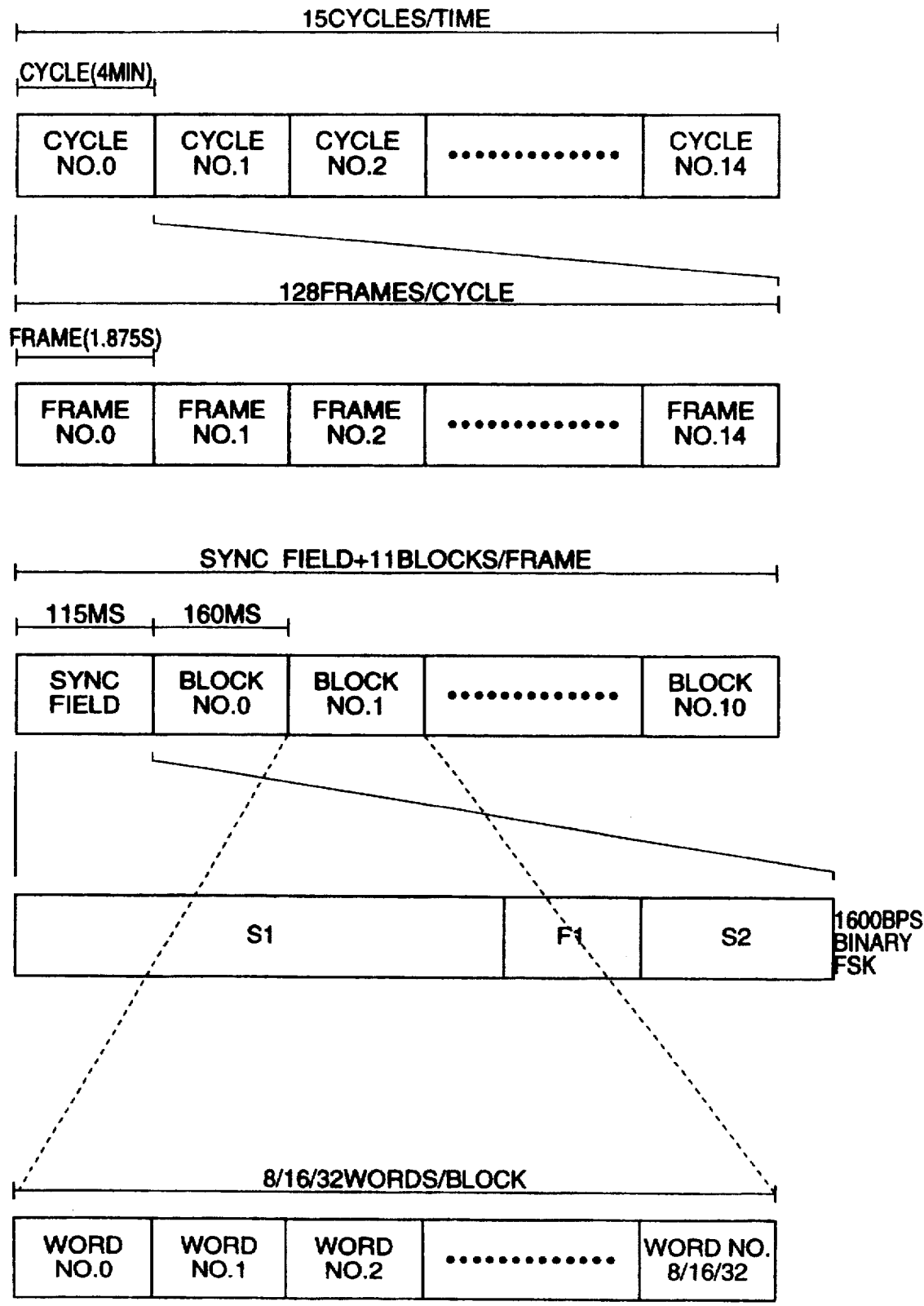
FIG. 2 is a diagram showing the layout of the format of air frames received by receivers in the radio paging system.

That is, the transmitters 2 send air frames shown in FIG. 2 via the respective frequency channels to the receivers 4.

As can be seen from FIG. 2, each transmitter 2 transmits 128 air frames in each of 15 cycles attained by dividing one hour by 15, i.e., at an interval of four minutes. Each air frame includes one synchronization area and 11 blocks.

The synchronization area includes a synchronization field 1 (S1), a frame information (FI) field, and a synchronization field 2 (S2). Excepting the synchronization field 1 (SI) and frame information (FI) field, each frame is sent at either one of the transfer speeds of 1600 bits per second (bps), 3200 bps, and 6400 bps. On the other hand, the synchronization field 1 (S1) and frame information (FI) field are transmitted at 1600 bps in any case. The synchronization field 1 includes, in addition to a synchronization pattern for the air frame, information specifying transfer speeds for the synchronization field 2 (S2) and blocks. Moreover, the frame information includes such information items as a number assigned to a cycle (cycle number) for the transmission of the air frame and a number assigned to an air frame (air frame number) in the cycle. The synchronization field 2 includes a synchronization pattern for the blocks.

Additionally, each block includes eight 32-bit words when the block is sent at 1600 bps, 16 32-bit words when the block is sent at 3200 bps, 32 32-bit words when the block is sent at 6400 bps.

Furthermore, in the 3200 bps transmission, each of 16 words of each block is divided into two phases each including eight words. In addition, in the 3200 bps transmission, each of 32 words of each block is subdivided into four phases each including eight words. Namely, each phase includes eight words for each block and 88 words for each air frame. In this embodiment, 88 words constitute one transmission frame. FIGS. 3 to 5 shows allocation of phases to each word of blocks. In the diagram, word nx denotes that the pertinent word is the n-th word in the pertinent block in phase x.

As can be seen from FIGS. 3 to 5, each word includes 21 information bits, ten check (BCH) bits as error correction codes for 21 information bits, and one parity bit for parity related to 31 bits including the 21 information bits and ten bits.

In this connection, to cope with burst errors, the respective words are interleaved before transmission thereof. In short, as shown in FIG. 3, the bits are selected in an order of the first bit of the first word, the first bit of the second word, and so on. Namely, the bits are sequentially selected for transmission thereof from the word series of FIGS. 3 to 5 from the upper-right position to the lower-left position along the column direction thereof.

In this case, 88 words of each communication frame are configured as shown in FIG. 6. That is, the 88-word frame includes block information (BI), address information (AF), vector information (VF), message information (MF), and idle information (IB).

The block information of each communication frame includes positions respectively of the address information and vector information. Moreover, in a communication frame of the first air frame of each cycle, a point of time (real time) to send information of the pertinent air frame is transmitted as block information. Namely, the real time is sent every four minutes. Furthermore, in addition thereto, when the system supports also time zones and local channels, information items thereof can also be transmitted as block information.

Next, the address information includes address of a receiver 4 to receive the pertinent communication frame. Additionally stored in the vector information are information items specifying a type of message information and the contents of service. The idle information is invalid word information.

In the above configuration, each receiver 4 is beforehand assigned with a receivable frequency channel, a receivable frame number, a receivable phase, and an address thereof. Furthermore, the receivable and processible transfer speed varies between the receivers 4. That is, there are mixedly provided receivers 4 capable of respectively processing 1600, 3200, and 6400 bps communication frames. Each receiver 4 receives a communication frame of the allocated phase of an air frame of the allocated frame number on the allocated frequency channel. When there exists any transmission error in a word, the receiver 4 corrects the word according to the BCH bits added thereto. The receiver 4 conducts a process according to vector information of the frame when the address information matches the address thereof and then presents the message contained in the message information on the display or the like thereof. In addition, when the message information is sent in a cryptographic form, there is also carried out, for example, a process in which the received message is decoded by a cipher or password key registered to the receiver 4 in advance. Incidentally, a communication frame to be sent to a receiver 4 is transmitted at a transfer speed applicable to the receiver 4, which will be described later.

In this connection, although 88 words of a phase of each air frame is employed as one communication frame in the embodiment above, it is also possible to subdivide each communication frame into a plurality of subordinate communication frames so as to repeatedly send the subframes.

Description has been given of the format of air frames communicated between the transmitter 2 and receiver 4 in the embodiment.

Next, description will be given in detail of the respective sections of the radio paging system in accordance with the present invention.

First, details of the central exchange 1 will be described.

As shown in FIG. 1, the central exchange 1 includes a subscriber database 13, a switchboard 11, and an encoding section 12.

Registered in advance to the subscriber database 13 are a subscriber number, an address of a receiver to be used by a subscriber having the subscriber number, a frequency channel assigned to the receiver 4, a frame number and a phase, a password key to be used by the receiver, a transfer speed available for the receiver, and the like.

On receiving a message from the network 5, the switchboard 11 sequentially conducts a retrieval operation through the database 13 according to the subscriber number added to the message to thereby attain a frequency channel, a frame number, a phase, and a transfer speed for transmission of the message. Thereafter, the switchboard 11 encodes the message according to the retrieved password key. Additionally, on the basis of the retrieved information, the switchboard 11 creates a switchboard frame shown in FIG. 7 for each air frame.

As shown in the diagram, one switchboard frame corresponds to one air frame sent from a transmitter 2. The frame includes a frame length of the switchboard frame, a frame number of the associated air frame, a frequency channel for transmission of the associated air frame, a cycle number of a cycle for transmission of the related air frame, a frame number of the associated air frame, message information to be transmitted by the related air frame, cyclic redundancy codes (CRC) information for error correction of the switchboard frame, and the like. Furthermore, the message information of the switchboard frame is configured by removing from the associated air frame the synchronization area, the BCH bits and parity bit of each word of each block, and the real time of block information. In short, when the synchronization area, the BCH bits and parity bit of each word of each block, and the real time of block information are added to the message information of FIG. 7, there can be configured an air frame.

The switchboard 11 sends the above switchboard frame at a predetermined transfer speed to the encoder 12 via the dedicated digital line, leased digital line, or plural analog lines.

In the following description, it is assumed to use eight frequency channels in the embodiment. In this case, the maximum transmission speed of the air frame of the transmitter is 6400 bps and the number of air frames transmitted at the same time is eight which is the same as the number of frequency channels. Consequently, it is necessary for the switchboard 11 to send the switchboard frame at a speed of at least 51200 bps. Assume now that digital transmission paths available on the leased and dedicated digital lines have a transmission speed of 192 kbps and the line capacity of the leased and dedicated digital lines is 64 kbps. Moreover, the guaranteed transmission speed and line capacity are 9600 bps when there is employed a modem for the analog lines. In this situation, on the leased and dedicated digital lines, switchboard frames to be simultaneously sent via different frequency channels of one communication line are multiplexed by a time-sharing operation and hence each switchboard frame can be transmitted without any problem. However, the switchboard frame cannot be sent via only one analog communication line. Therefore, when using analog lines, the switchboard 11 uses one analog line for each frequency channel, namely, a total of eight analog lines to send information to the encoder section. In this connection, the transfer speed of the air frame at this point of time does not match the transfer speed of each section for the air frame sent from the transmitter 4.

In this case, there are further arranged two systems of transmission lines for switchboard frames between the switchboard 11 and the encoder 12 to duplicate the transmission lines. Namely, the switchboard 11 sends the same contents via the independent systems of lines to the encoder 11. For example, two leased digital lines or two dedicated digital lines are duplicated as one system per line; alternatively, 16 analog lines are grouped into two systems each including eight lines so as to form a duplicated system of two systems.

Next, on receiving the switchboard frame from the switchboard 11, the encoder 12 creates therefrom air frames and then distributes the frames to the respective transmitters 3.

Figure 8:
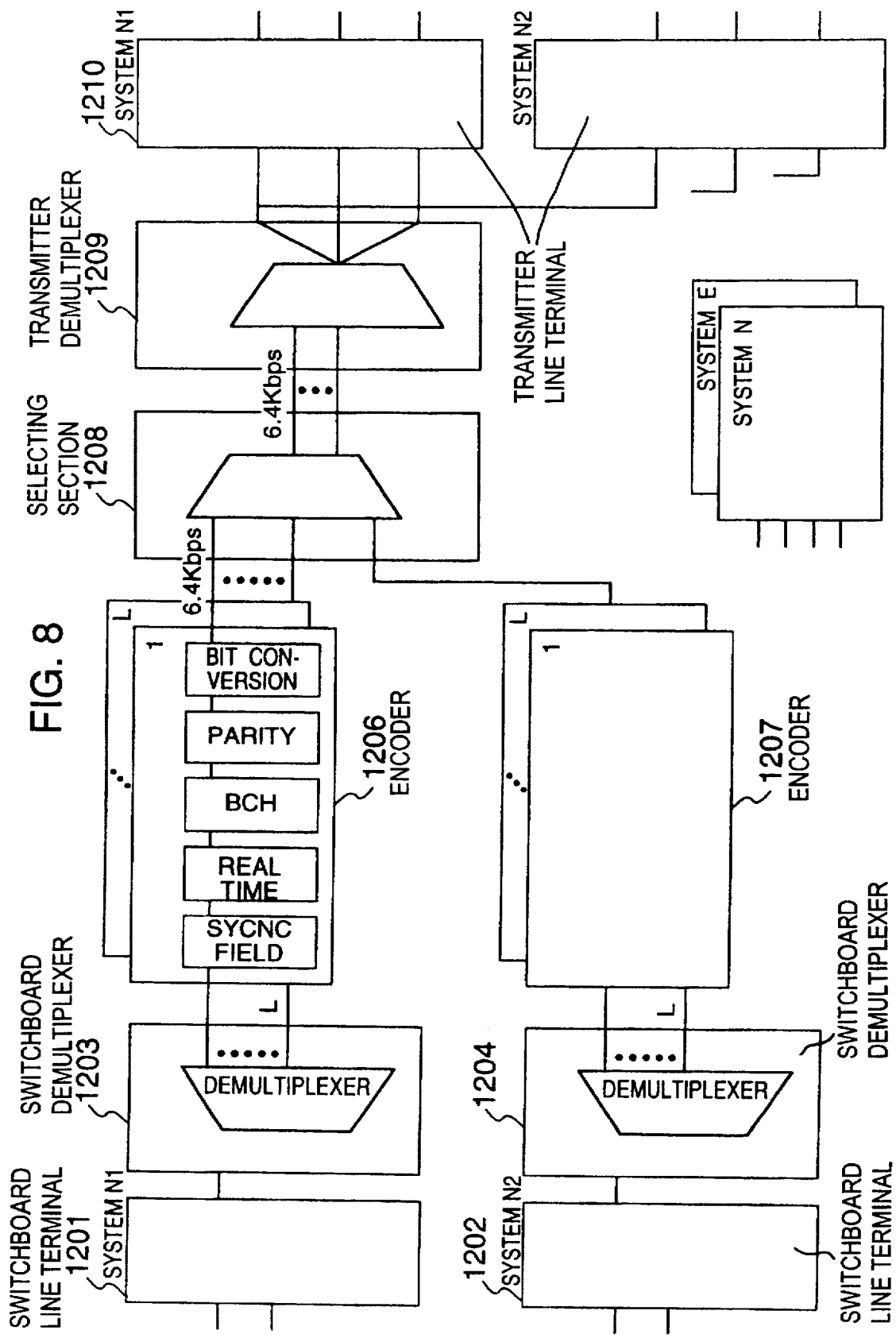
FIG. 8 is a block diagram showing structure of an embodiment of an encoder section of the central exchange according to the present invention.

FIG. 8 shows structure of the encoder 12.

As shown in the diagram, the encoder section 12 includes two switchboard line terminals 1201 and 1202, two switchboard demultiplexers 1203 and 1204, two sets of encoders 1206 and 1207 associated with the number of frequency channels, a selecting section 1208, a transmitter demultiplexer 1209, two transmitter line terminals 1210 and 1211, and a monitor controller 1213.

Each of the switchboard line terminals 1201 and 1202 is connected to either one of the systems of duplicated lines connected to the switchboard 11. The switchboard line terminal 1201, switchboard demultiplexer 1204, and set of encoders 1206 construct system N1 on switchboard side. The switchboard line terminal 1202, switchboard demultiplexer 1205, and set of encoders 1207 construct system N2 on switchboard side. The selector 1208 selects one of the outputs from the systems N1 and N2. That is, the group including the switchboard line terminal 1202, switchboard demultiplexer 1205, and set of encoders 1207 is duplicated, and the selector 1208 decides which one of the systems is to be effective.

Furthermore, to duplicate the line between the encoder 13 and each transmitter 2, there are disposed two transmitter line terminals 1210 and 1211 respectively constituting the systems N1 and N2 on transmitter side. Two terminals 1210 and 1211 send the same contents to each transmitter 2.

Since the same operation is conducted by the systems N1 and N2 on both of the switchboard and transmitter sides as above, description will be given of the operation of the encoder representatively in the system N1 on the switchboard and transmitter sides.

First, on receiving a switchboard frame from the switchboard 11 via either one of the duplicated systems of lines, the switchboard line terminal 1201 passes the frame to the switchboard demultiplexer 1203. However, in case where one system includes eight analog lines, switchboard frames received from the respective analog lines are multiplexed in a time-sharing manner such that the resultant frames are passed to the switchboard demultiplexer 1203. In addition, the switchboard line terminal 1201 conducts, for example, a transmission error correction of the switchboard frame according to the CRC thereof (FIG. 7).

Subsequently, the switchboard demultiplexer 1203 demultiplexes the multiplexed frame thus received and then distributes the obtained frame items according to the frequency channel information added to the switchboard 11 to one of the encoders constituting the set 1206 responsive to the frequency channel for transmission of the switchboard frame (FIG. 7).

Each encoder of the set 1206 then creates an air frame from the distributed switchboard frame. Namely, the encoder obtains the BCH bits and parity bits of each word of each block and real time to transmit the pertinent air frame and then adds the obtained BCH and parity bits to the word of message information of the switchboard frame and the real time to the block information. Moreover, the encoder adds as a first item a synchronization area generated according to, for example, information of the transfer speed contained in the switchboard frame, thereby producing an air frame. In this regard, the real time is decided on the basis of the current time controlled by the monitor or supervisory controller 1213. The control operation of the current time by the monitor controller will be described later in detail.

As above, the air frame bit length varies between the air frames thus created by the respective encoders. This is because the number of bits contained in the air frame varies depending on the transfer speed described above. Moreover, the air frame produced by each encoder is required to be multiplexed in the time-sharing manner before transmission thereof to the transmitters 2. However, in general, it is not easy to multiplex in the time-sharing manner the frames having mutually different bit lengths while guaranteeing synchronization thereof on the receiving side.

To overcome this difficulty, in accordance with the embodiment, the bits (of the synchronization area and the respective blocks) of the air frame to be sent at 1600 bps are transformed into four-bit data, and the bits (of the synchronization area and the respective blocks) thereof to be sent at 3200 bps are transformed into four-bit data. In the transforming operation, after one bit to be transformed, there is (or are) inserted one bit (or three bits) of the same value. Thereafter, the air frames, which have a fixed length in any case as a result of the conversion, are sent to the transmitter demultiplexer 1209 at the transfer speed of 6400 bps. Thanks to the provision, after the transmitter demultiplexer 1209, the respective air frames can be processed by a circuit of a simple configuration in a similar fashion without discrimination therebetween.

Figure 9:
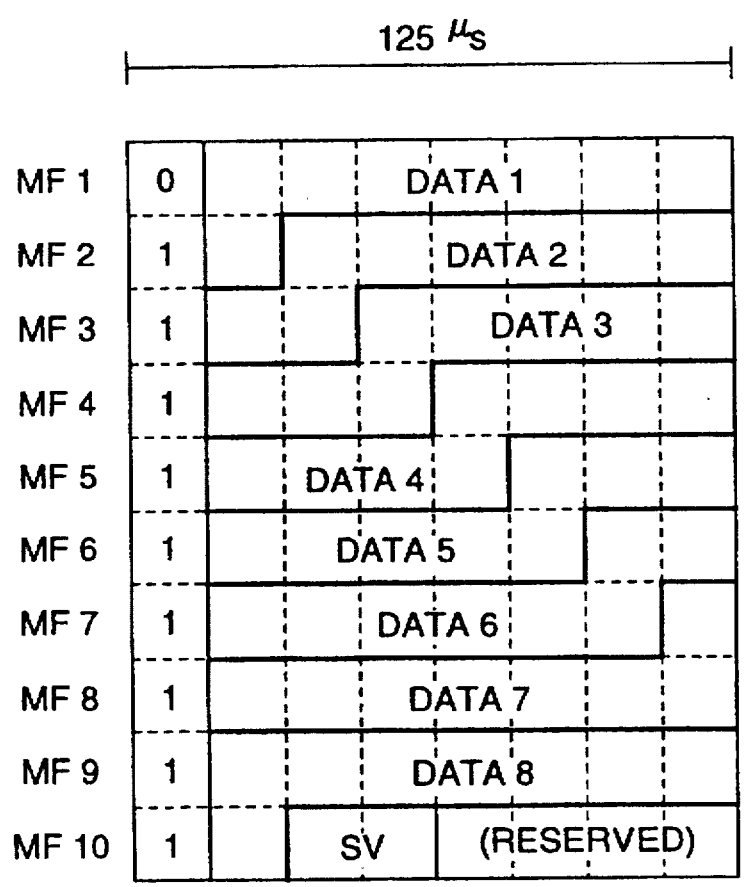
FIG. 9 is a diagram showing constitution of an embodiment of a multi-frame according to the present invention.

The transmitter demultiplexer 1209 demultiplexes in the time-sharing fashion eight frames sent from eight encoders of the set 1206 and the 1600 bps monitor control signal from the monitor controller 1213 as described above, thereby producing a multiframe to be transferred at 64 kbps shown in FIG. 9. In FIG. 9, DATAn indicates eight-bit data of the n-th air frame. Moreover, SV stands for a monitor control signal and P designates parity for the multi-frame. One multi-frame corresponds to the 64 bits of air frames (eight bits per air frame) and two bits of the monitor control signal. Incidentally, when transferring the multi-frame items, the items are transferred in a direction from the upper-left corner to the lower-right corner along the column direction. In other words, the items are transferring in the order of MF1, MF2, . . . , and MF10 of the diagram.

The items of the multi-frame thus produced are then sequentially sent to the transmitter line controller 1210.

The line controller 1210 sends the 64 kbps multi-frame, received from the transmitter demultiplexer 1209, to the respective transmitters via eight analog lines or one dedicated or leased digital line.

For this purpose, the transmitter line controller 1210 conducts a process to send the 64 kbps multi-frame to a dedicated or leased digital line of a capacity of 64 kbps on the digital transmission path at a transmission speed of 192 kbps to thereby transmit the multi-frame to the transmitters 2 connected via the dedicated or leased line and a process to subdivide and distribute the 64 kbps multi-frame onto eight analog lines to thereby transmit the multi-frames to the transmitters 2 connected via the analog lines.

Figure 10:
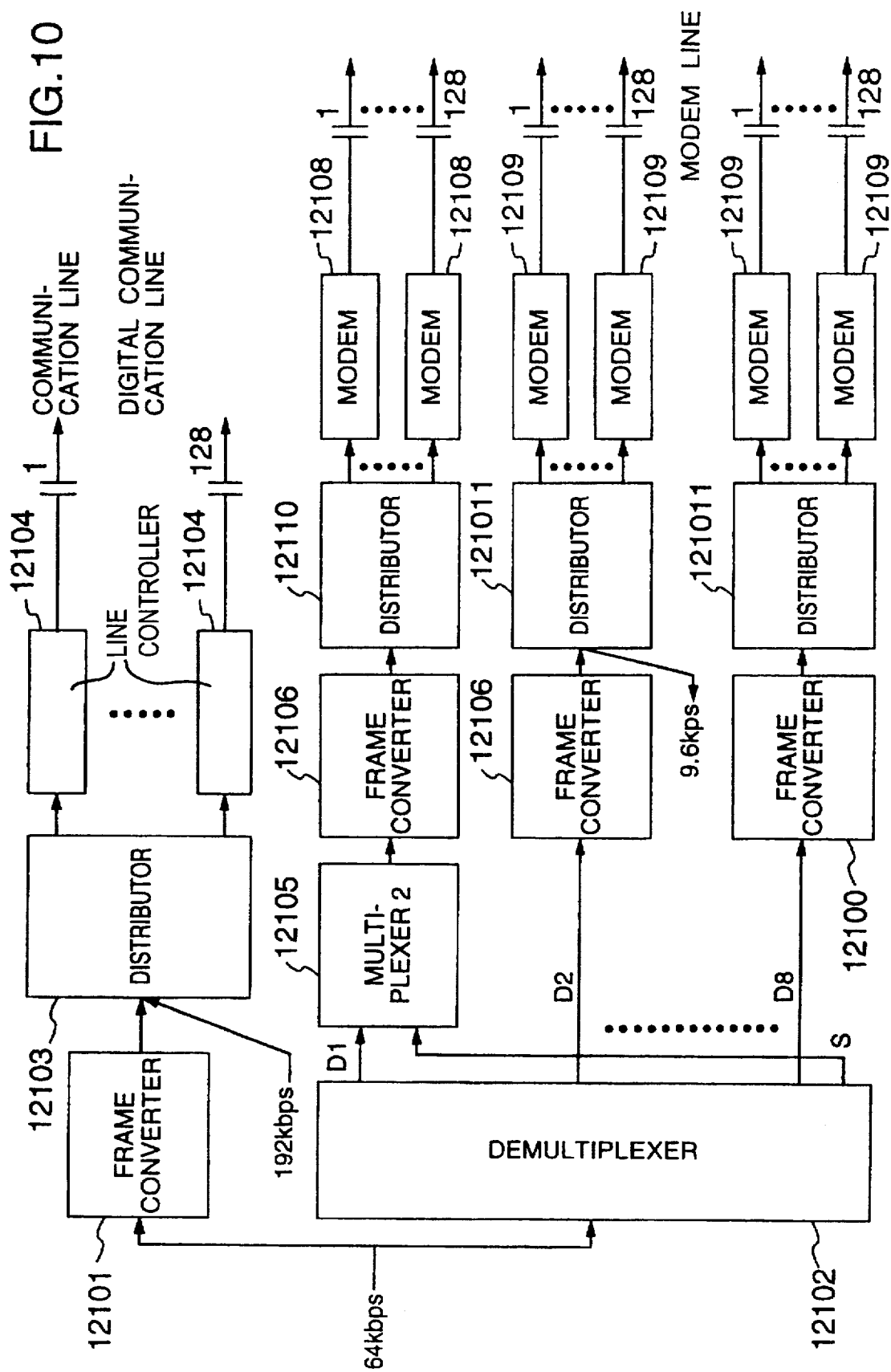
FIG. 10 is a block diagram showing the configuration of an embodiment of a transmitter line terminal of the central exchange according to the present invention.

FIG. 10 shows the construction of the transmitter line terminal.

Figure 11:
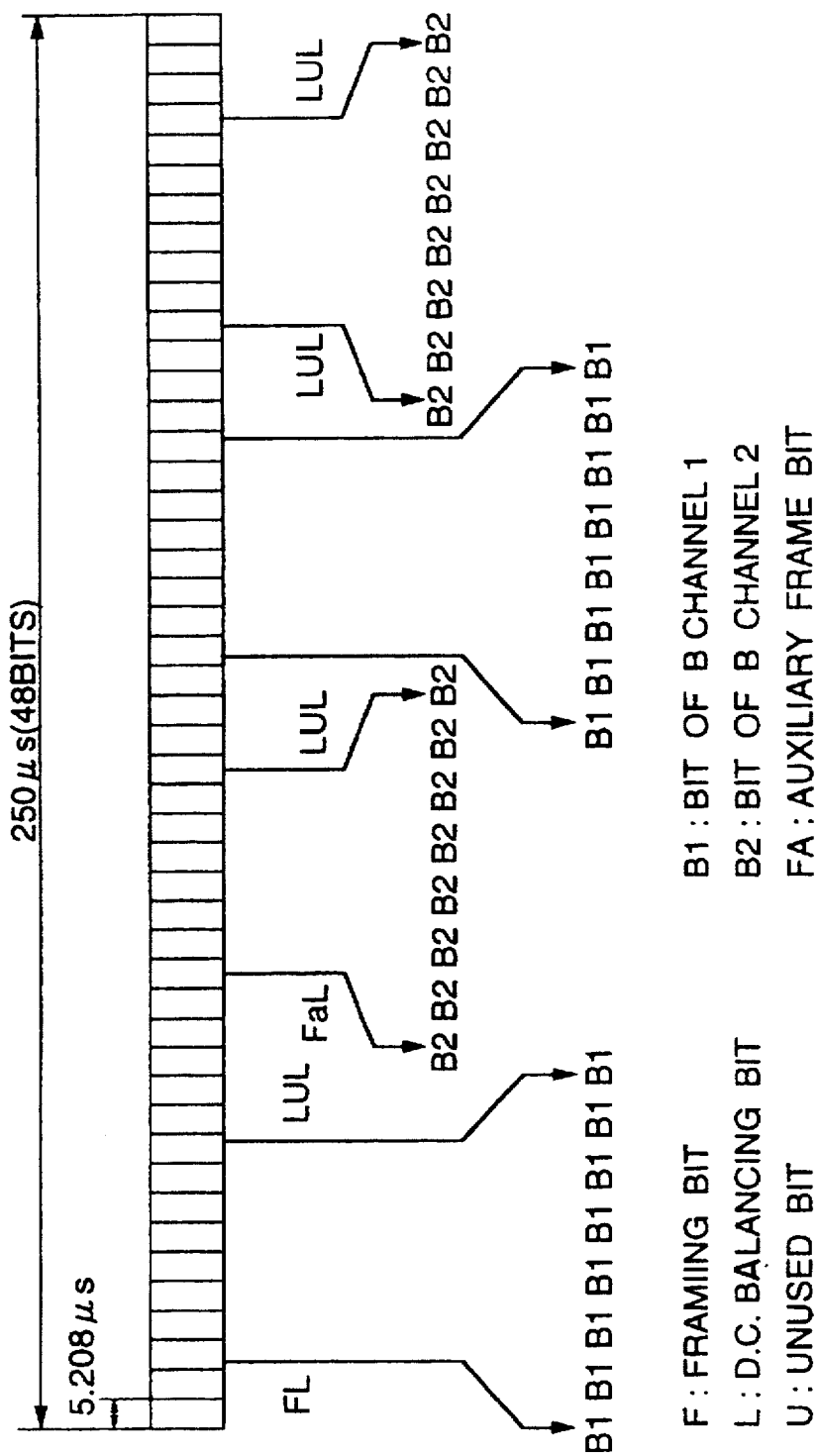
FIG. 11 is a diagram showing the transmission format of a dedicated digital transmission path.
Figure 12:
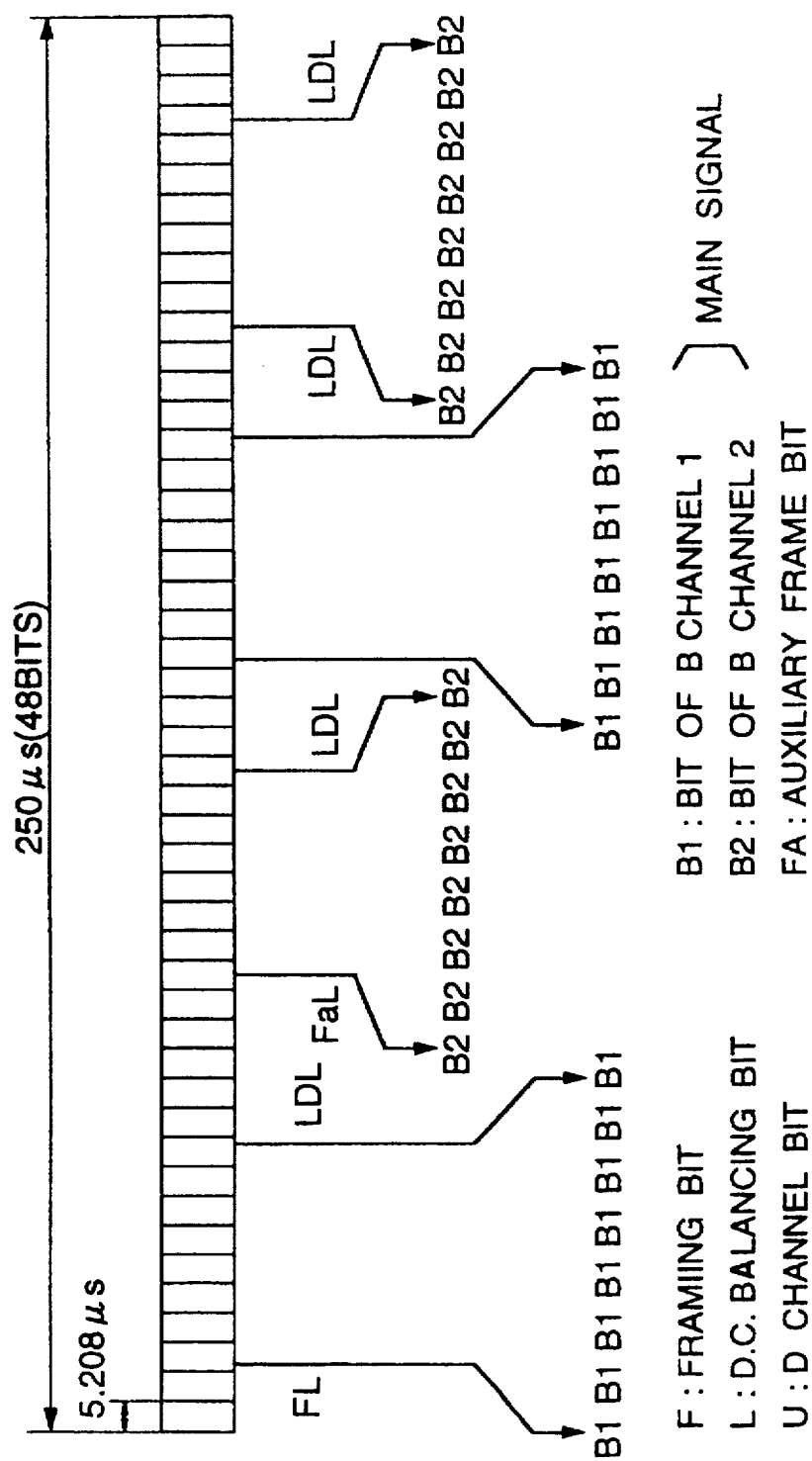
FIG. 12 is a diagram showing the transmission format of a leased digital transmission path.

To send the multi-frame via the dedicated or leased digital line in this configuration, it is only necessary that the speed of the multi-frame is converted into 192 kbps by a frame converter section 12101 and is then passed to a B1 or B2 channel shown in FIG. 11 or 12 such that the multi-frame is distributed by a distributor 12103 to line controllers 12104 each being connected via one dedicated or leased digital line to the transmitter 2 (128 transmitters in total).

Figure 13:
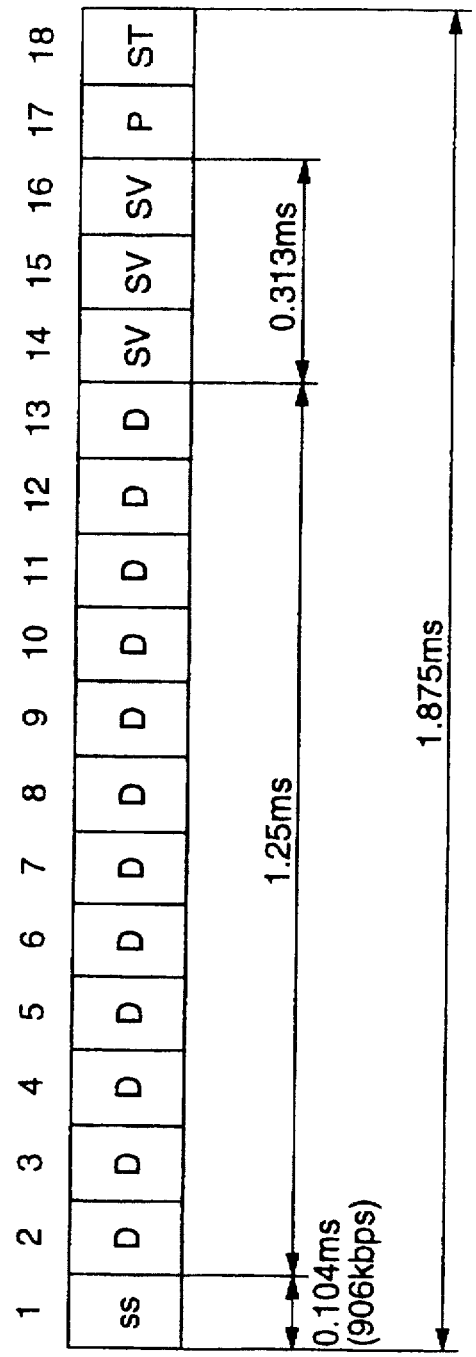
FIG. 13 is a diagram showing multiplexing rules of air frames and a monitor control signal used when analog lines are adopted in the embodiment of the present invention.

On the other hand, to transmit the multi-frame via eight analog lines, the bits thereof are again demultiplexed by a demultiplexer 12102 into bits of the respective air frames and those of the monitor control signal. The 6400 bps bits of the air frames of the first frequency channel and the 1600 bps bits of the monitor control signal are then multiplexed by a multiplexer 12105 as shown in FIG. 13. Thereafter, appropriate bits such as those of a flag and parity are added thereto by each frame converter 12106 to thereby create a 9600 bps frame. The frame is distributed by a distributor 12110 to a first modem 12108 handling the first analog line of each set of eight analog lines (the respective sets being connected to mutually different transmitters). Moreover, to send the 6400 bps bits of air frames of the second to eighth frequency channels, appropriated bits are respectively added thereto to create a 9600 bps frame. The frame is distributed by a distributor 12107 to modems 12109 responsive to the second to eighth analog lines of the sets of eight analog lines.

In this connection, the transmitter line terminal 1211 of system N2 also conducts operation in a manner similar to that of the transmitter line terminal 1211 of system N1. Namely, disposed between the central exchange 1 and the respective transmitters 2 are two systems of transmission lines to provide a duplicated system. Two leased or dedicated digital lines are used for duplication in which one line is allocated to one system, or 16 analog lines are grouped into two 8-line systems for duplication of two line systems.

In this regard, to confirm the normal operation of systems N1 and N2 on switchboard side, these systems are substituted for each other in a periodic manner by a selector section 1208. Furthermore, when the system being used fails, the failed system is substituted for the other system by the selector 1208. The replacement is supervised by the monitor controller 1213.

Description has been given of operation of the central exchange 1. However, details of the monitor controller 1213 will be described later.

Subsequently, description will be given of the transmitter 2.

As can be seen from FIG. 1, each transmitter 2 includes a synchronizing section 21 and a plurality of transmitting units 22 each being responsive to one frequency channel.

Figure 14:
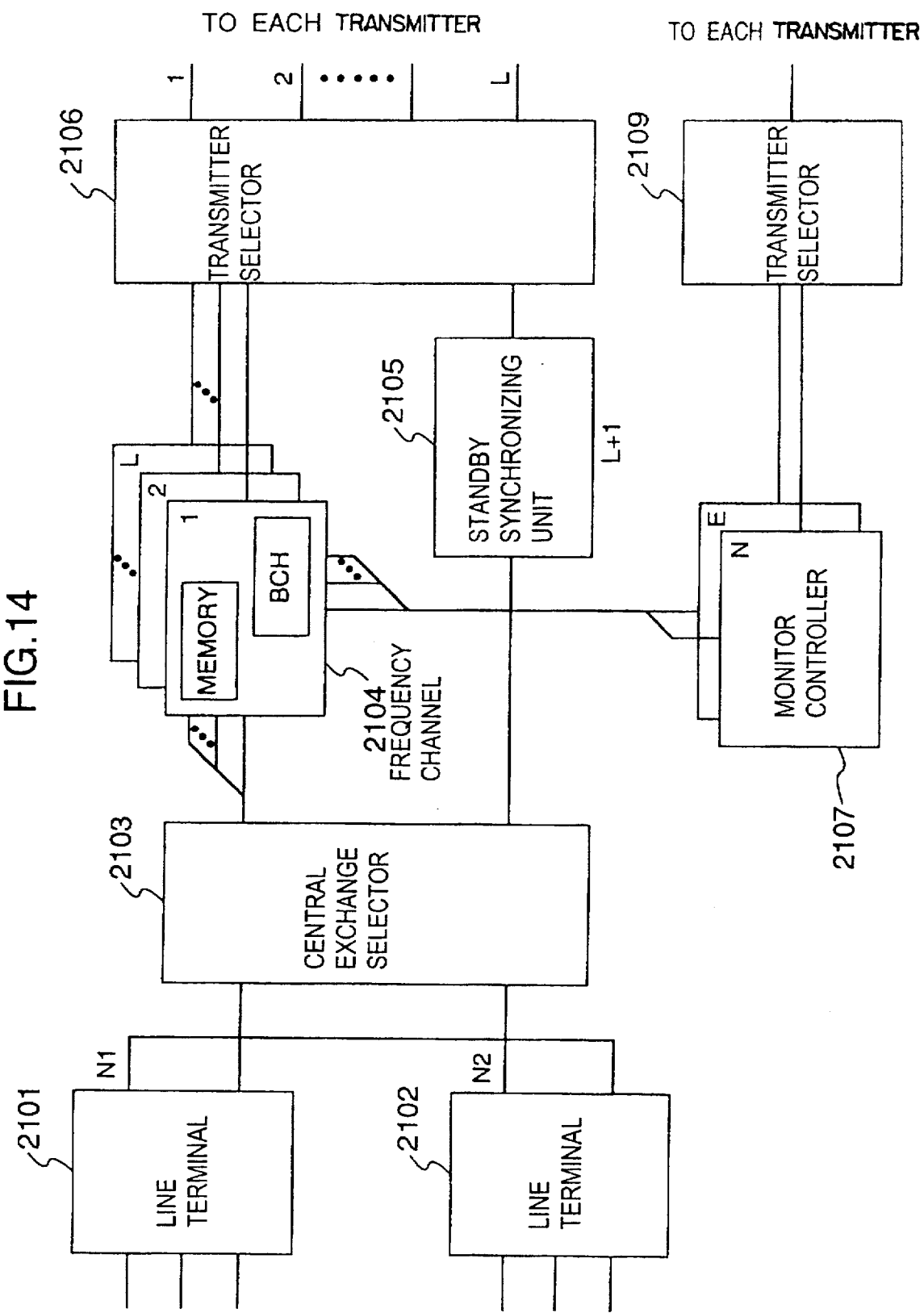
FIG. 14 is a block diagram showing structure of an embodiment of a synchronizing section of a transmitter according the present invention.

FIG. 14 shows the configuration of the synchronizing section 2.

As shown in the diagram, the synchronizer 21 includes two line terminals 2101 and 2102, a central exchange selector 2103, a set of synchronizing units for frequency channels 2104, a standby synchronizing unit 2105, transmitter selectors 2106 and 2109, and a monitor controller 2107.

Two line terminals 2101 and 2102 are respectively connected to either one of two systems of lines connected to the central exchange 1 and restore the respective air frames and the monitor control signal from the frames sent from the central exchange 1 in the format described above. The central exchange selector 2103 validates only either one of the outputs from two line terminals 2101 and 2102.

The monitor control signal thus restored by the line terminal 2101 or 2102 validated by the central exchange selector 2103 is sent to the monitor controller 2107, and the respective air frames are sent to those of the set of synchronizing units 2104 responsive to frequency channels for transmission of the air frames.

Each synchronizing unit of the set 2104 once stores the air frame in a memory and accomplishes the BCH bit check for each word of each block of the air frame for a transmission error. If such an error is detected, the synchronizing unit reports the condition to the monitor controller 2107. When the frequency of transmission errors notified from the respective synchronizing units becomes equal to or more than a fixed value, the monitor controller 2107 controls the central exchange selector 2103 to validate outputs from the currently invalid one of the line terminals 2101 and 2102. In other words, the line terminals are replaced with each other.

Furthermore, the monitor controller 2107 reads, in cooperation with the respective synchronizing units of the set 2104, an air frame from the memory and sends the frame to a transmitting unit 22 responsive to a frequency channel associated therewith so that the frame is sent to a receiver 4 at a point of time specified by the cycle number, frame number, and real time contained in block information of frame number 1 according to the cycle number and frame number of each air frame stored in the memory, the real time contained in block information of frame number 1, and the current time 2107 controlled by the monitor controller 2107. Additionally, each synchronizing unit checks the synchronization area of each air frame to detect a transfer speed to transmit each block and then reports the speed to the monitor controller 2107. The controller 2107 passes the received transfer speed to a transmitting unit 22 to transmit the associated air frame.

Each transmitting unit 22 processes the air frame sent from the corresponding synchronizing unit and restores, according to the transfer speed notified from the monitor controller 2107, the portion thereof undergone the bit conversion in the encoder 12 of the central exchange 1, thereby transmitting the synchronization area 1 and frame information of the air frame at 1600 bps and the other portions at a transfer speed reported from the monitor controller 2107.

In this connection, when either one of the synchronizing units fails in the set 2104, the standby synchronizing unit 2105 is validated by the central exchange selector 2103 and transmitter selector 2106 to be used as a substitutive unit of the failed synchronizing unit.

Furthermore, between the line terminals 2101 and 2102 of the synchronizing section 21 of each transmitter 2 and the transmitter line terminals 1210 and 1211 of the encoder 12 of the central exchange 1, there are disposed lines in the direction (upward direction) from the synchronizing section 21 of the transmitter 2 to the encoder 12 of the central exchange 1. Using the lines, the monitor controller 2107 of the synchronizing section 21 of each transmitter 2 can send the monitor control signal in the upward direction to the monitor controller 1213 of the encoder 12 of the central exchange 1.

In this case, to prevent the operation errors associated with radio interferences in the receiver 4 as described above, the respective transmitters 2 are required to transmit the same air frames almost at the same time. That is, the transmission of the same air frames is required to be synchronized in the respective transmitters 2.

Subsequently, description will be given of a procedure of achieving the synchronization of transmission of air frames in the embodiment.

First, for each area, one of the transmitters 2 arranged in the pertinent area is determined as a reference station or transmitter in the embodiment as shown in FIG. 15 or 16. Additionally, another one of the transmitters 2 arranged in the pertinent area is determined as a standby reference station. (In the following description, the reference station, standby reference station, and other transmitters are collectively called transmitters if these transmitters need not be particularly discriminated from each other). Furthermore, the reference and standby reference transmitters are connected via a dedicated or leased digital line to the central exchange 1 in the embodiment.

Moreover, the monitor controller 2107 of the synchronizing section 21 of each transmitter 2 and the monitor controller 1213 of the encoder 12 of the central exchange 1 each have constitution to control the synchronization of air frame transmissions.

Figure 17:
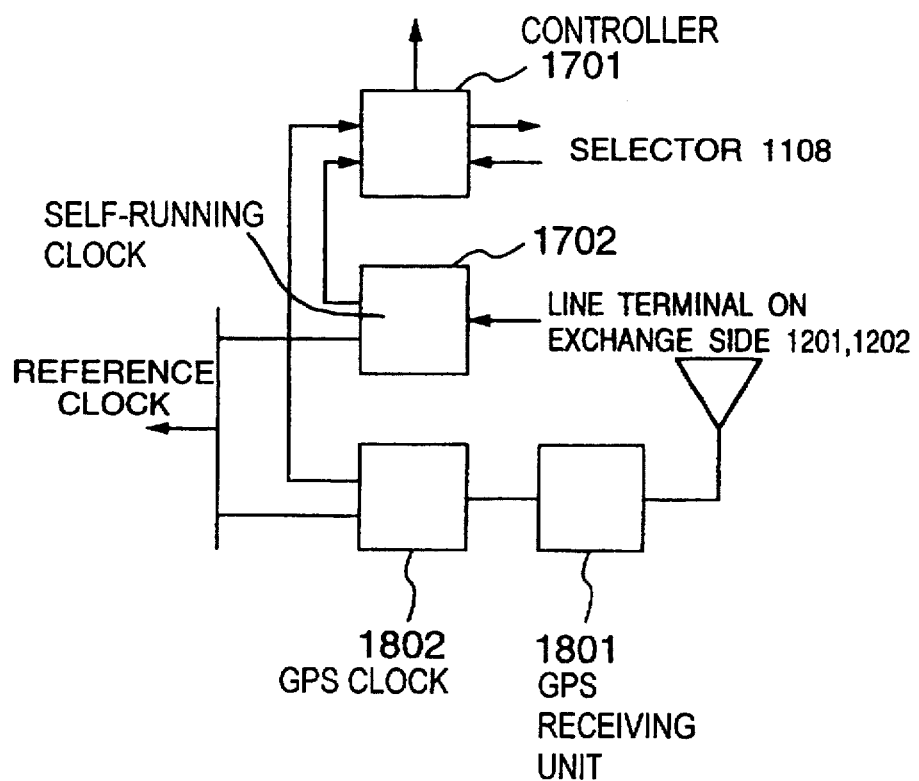
FIG. 17 is a block diagram showing the configuration of an embodiment of a monitor controller of the central exchange according to the present invention.

That is, the monitor controller of the encoder 12 of the central exchange 1 includes a GPS receiving unit 1801, a GPS clock 1802, a self-running clock 1702, and a controller 1701 as shown in FIG. 17. The controller 1701 produces a control output connected to the respective sections of the encoder 12. Additionally, the controller 1701 possesses a communication line to communicate a monitor control signal with the respective transmitters 2, the communication line being linked with the transmitter demultiplexer 1209.

Figure 18:
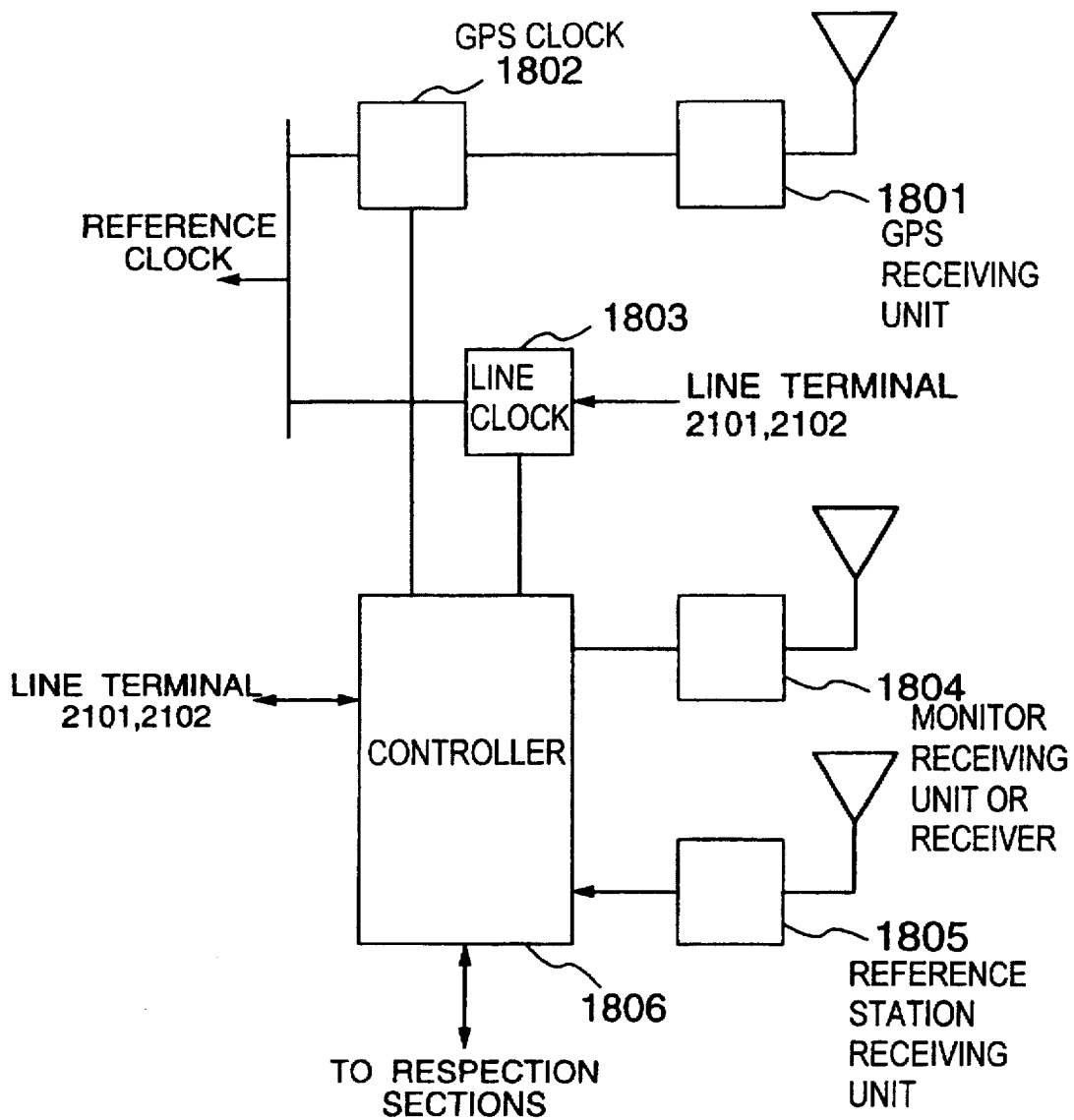
FIG. 18 is a block diagram showing structure of an embodiment of a monitor controller of a transmitter connected via a digital line to the central exchange of the present invention.

Next, the monitor controller 2107 of each of the transmitters 2 which are other than the reference and standby reference stations and which are coupled via a dedicated or leased digital line to the central exchange 1 includes a GPS receiving unit 1801, a GPS clock 1802, a monitor receiving unit or receiver 1804, a line clock 1803, a controller 1806, and a reference station receiving unit or receiver 1805 as shown in FIG. 18. The controller 1806 outputs a control signal connected to each elements of the synchronizing section 21. Moreover, the controller 1806 has a communication line of a monitor control signal with the central exchange 1, the line being linked with the line terminals 2101 and 2102.

Figure 19:
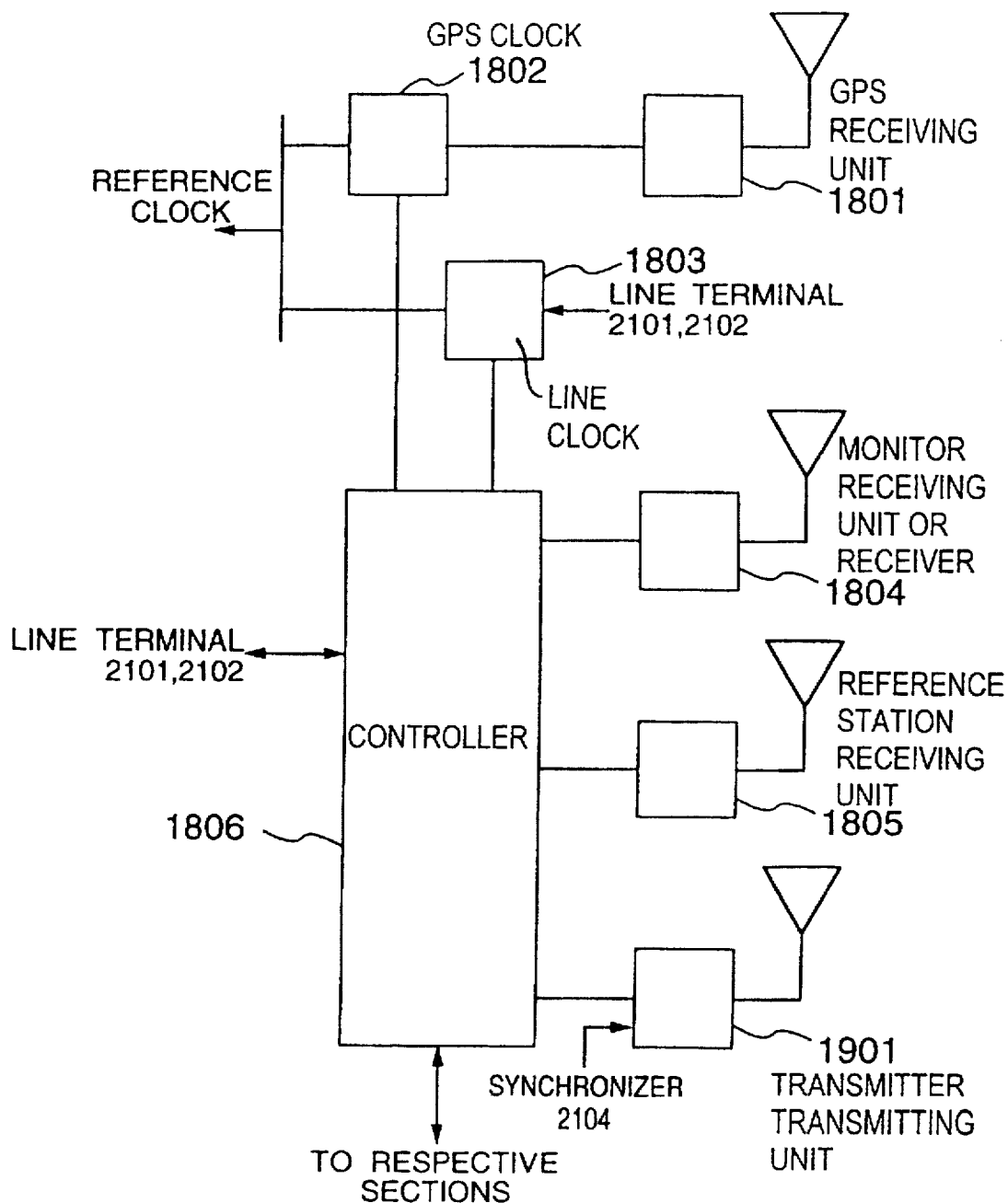
FIG. 19 is a block diagram showing constitution of an embodiment of a monitor controller of the standby reference station according to the present invention.

Moreover, the standby reference station includes, in addition to the configuration of FIG. 18, a transmitter transmitting unit 1901 to carry out communications via frequency channels for the transmitters as shown in FIG. 19.

Figure 20:
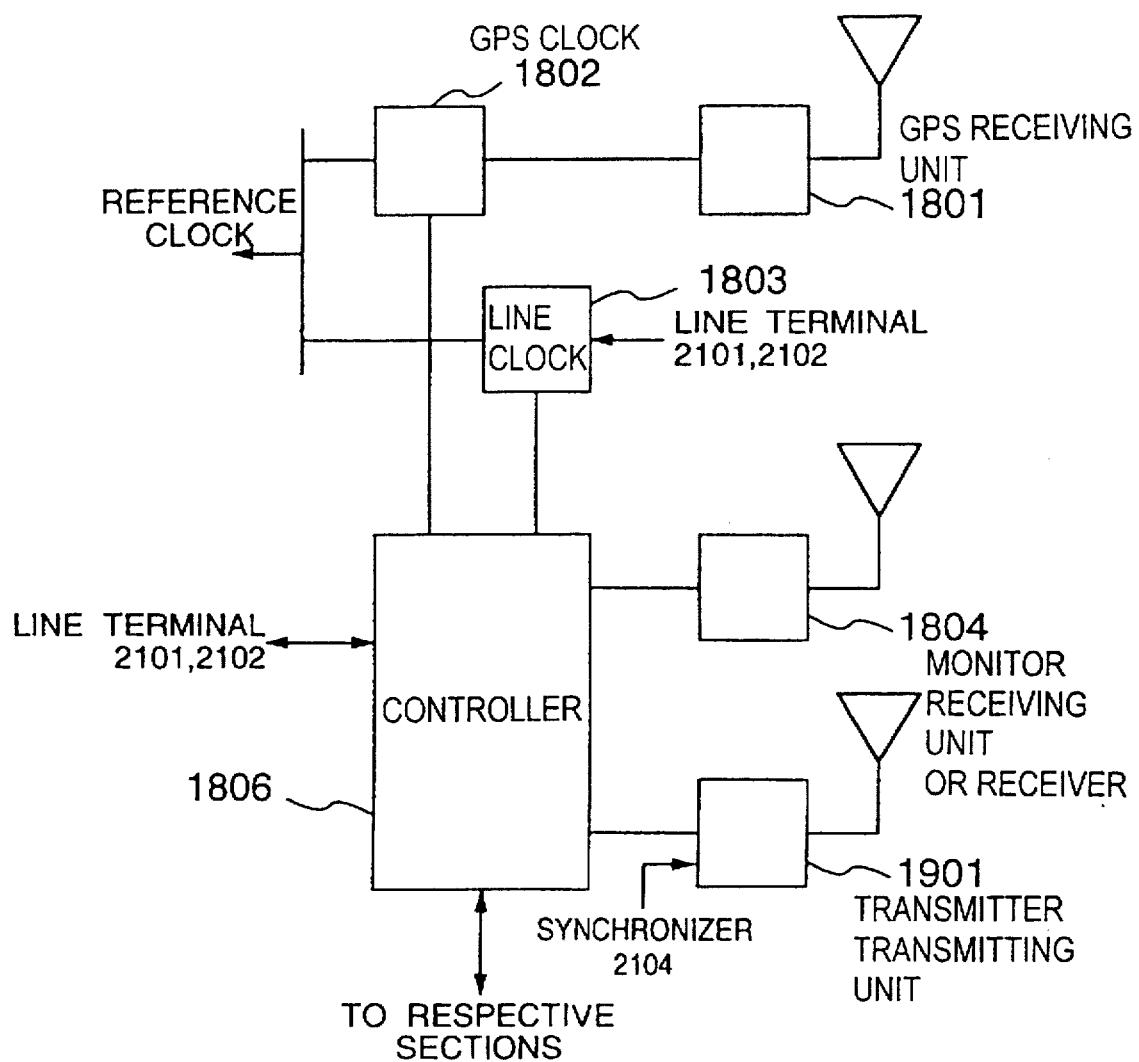
FIG. 20 is a block diagram showing constitution of an embodiment of a monitor controller of the reference station according to the present invention.

Furthermore, the reference station includes a GPS receiving unit 1801, a GPS clock 1802, a monitor receiving unit or receiver 1804, a line clock 1803, a controller 1806, and a transmitter transmitting unit 1901 to carry out communications via frequency channels for the transmitters 2 as shown in FIG. 20.

Figure 21:
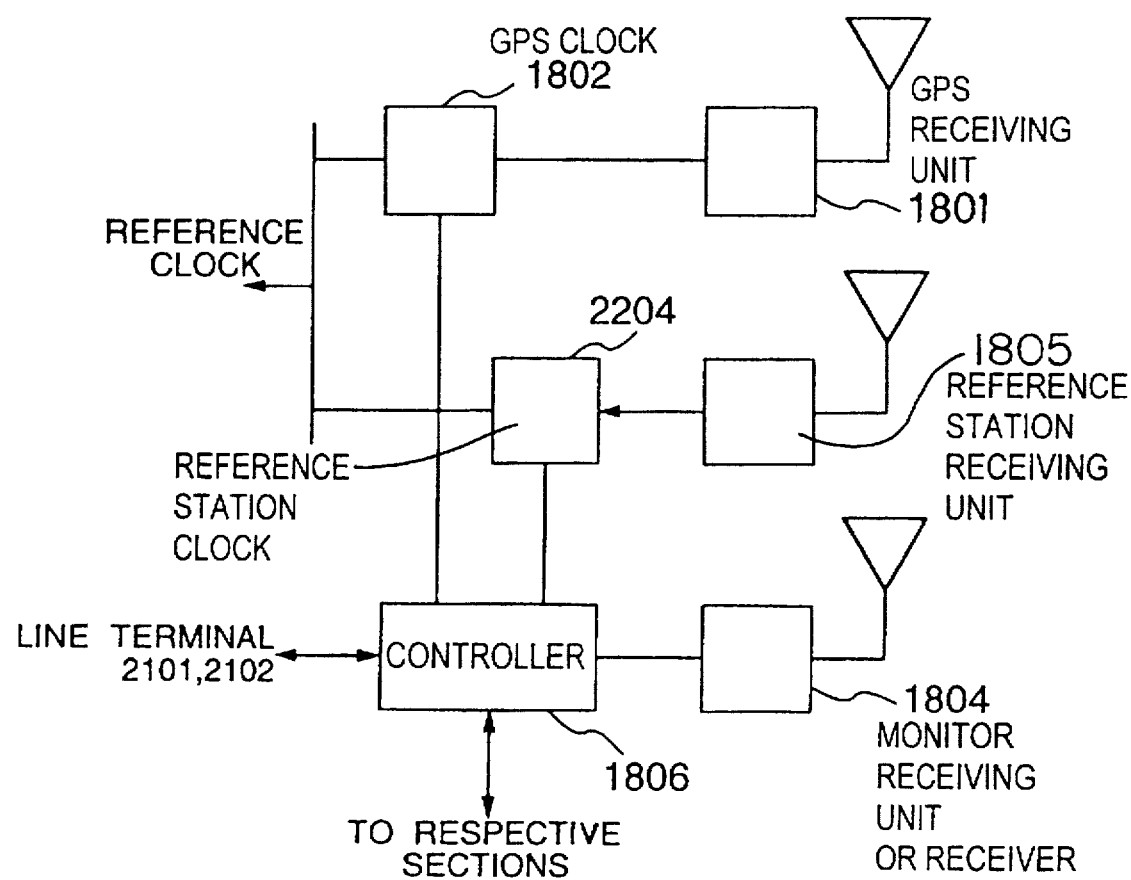
FIG. 21 is a block diagram showing structure of an embodiment of a monitor controller of a transmitter connected via digital lines to the central exchange according to the present invention.

Additionally, the monitor controller 2107 of each of the transmitters 2 which are other than the reference and standby reference stations and which are coupled via analog lines to the central exchange 1 includes a GPS receiving unit 1801, a GPS clock 1802, a monitor receiving unit or receiver 1804, a reference station receiving unit 1805, a reference station clock 2204, and a controller 1806 as shown in FIG. 21.

Subsequently, description will be given of operation of the synchronization of air frame transmissions primarily centered on operation of the respective monitor controllers 1213 and 2107.

First, in the initial state, each of the monitor controllers 2107 and 1213 of the central exchange 1 and transmitters 2 receives the current time sent from the GPS satellite and then sets the time to the GPS clock 1802. The time is sent from the GPS satellite at an interval of one second with a high precision. In addition, the delay of time of transmission from the GPS satellite to each station on the earth is approximately identical and hence is negligible. Therefore, the same time can be almost exactly set to the GPS clock 1802 of each station.

In this situation, each GPS clock 1802 measures, by use of clock signals of a predetermined frequency synchronized in phase by an integrated phase-locked loop (PPL) with the current time from the GPS satellite, one second relative to the current time thus set and then sequentially outputs the current time, thereby outputting as a reference clock the clock signal having the predetermined frequency.

Furthermore, to each of the controllers 1701 and 1806 of the respective monitor controllers 2107 and 1213 of the central exchange 1 and the respective transmitters 2 are set a total TMAX of a maximum value of delay time due to the line between the central exchange 1 and the transmitter 2, a maximum value TI of delay time due to the line terminals 2101 and 2102 of the encoder 21 of the transmitter 2, and a maximum value TD of the delay time required in the synchronizing unit when an air frame is read from the memory immediately after the air frame is stored therein. In addition, to the controller 1806 of the monitor controller 2107 of each transmitter, there is set a delay time dm due to the monitor receiver obtained according to a setting value or the like.

In the initial state described above, the radio paging system first conducts a training.

In the training, the controller 1701 of the monitor controller 1213 of the central exchange 1 activates an appropriate one of the encodes of the set 1206 (or 1207) to create a test air frame. Specified to the air frame is an appropriate time as the real time of the block information. The controller 1701 initiates the encoder to send the air frame to the transmitter demultiplexer 1209 so that the air frame is transmitted from the line terminal 1210 (or 1211) at a point of time earlier by TMAX than the specified real time according to the time of the own GPS clock 1802. Incidentally, after the encoder, the respective sections on the transmitter side are operated with clocks synchronized with the reference clock outputted from the own GPS clock 1802.

On the other hand, the synchronizing section 21 of each transmitter 2 temporarily stores the test air frame in a memory of the associated synchronizing unit. When the time of the GPS clock 1802 becomes equal to the real time of the block information in the air frame, the controller 1806 of the monitor controller 2107 controls the synchronizing section 2107 such that the air frame is read from the memory and is then sent via the selector 1208 to the transmitting unit 22.

Figure 22:
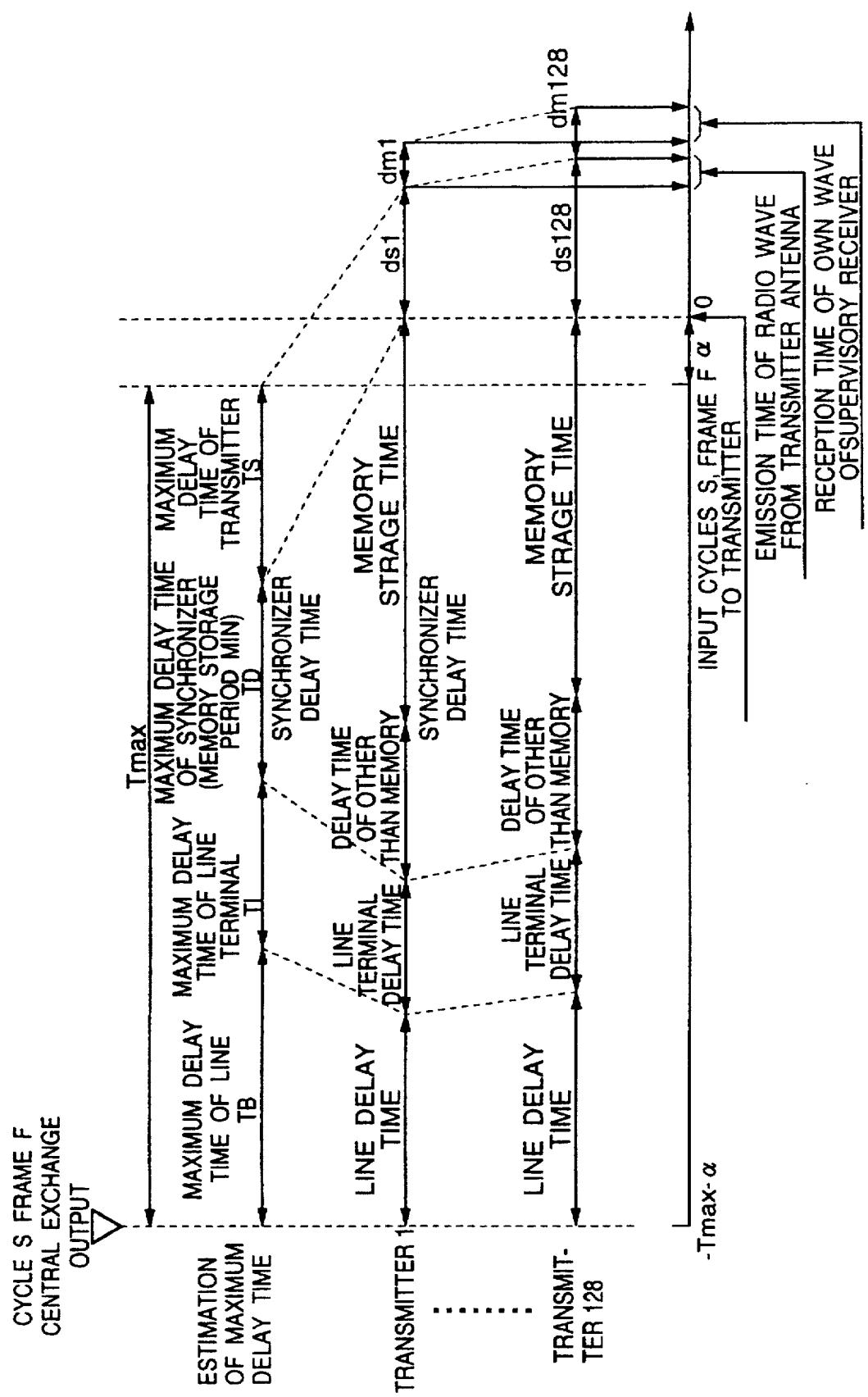
FIG. 22 is a diagram for explaining a procedure of attaining a delay time of a transmitting unit in the embodiment of the present invention.

Next, with the provision, the air frame sent from the transmitter 2 is received by the monitor receiver 1804 of the monitor controller 2107 as shown in FIG. 22. In the controller 1806, there is then attained discrepancy between the time of reception of the air frame by the monitor receiver 1804 measured according to the GPS clock 1802 and the real time in the block information of the air frame. Thereafter, regarding the obtained time difference as a delay time in the transmitting unit 22 and a delay time in the monitor receiver 1804, a value attained by subtracting a predetermined delay time dm due to the monitor receiver 1804 from the obtained difference of time is set as a delay time ds in the transmitting unit 22. Subsequently, the process to attain the delay time ds in the transmitting unit 22 is repeatedly executed a predetermined number so as to obtain a mean value of dm, thereby finally obtaining a delay time ds in the transmitting unit 22.

The training has been terminated as above.

When the training is finished, an ordinary operation is commenced.

In the usual operation, the monitor controller 1213 of the central exchange 1 activates the encoder to send each air frame to the emitter demultiplexer 1209 such that the frame is transmitted from the line terminal 1210 (or 1211) to the respective transmitters 2 at a time earlier by the TMAX than the time to send the frame from the transmitters 2 according to the time of the GPS clock 1802 of the central exchange 1.

Figure 23:
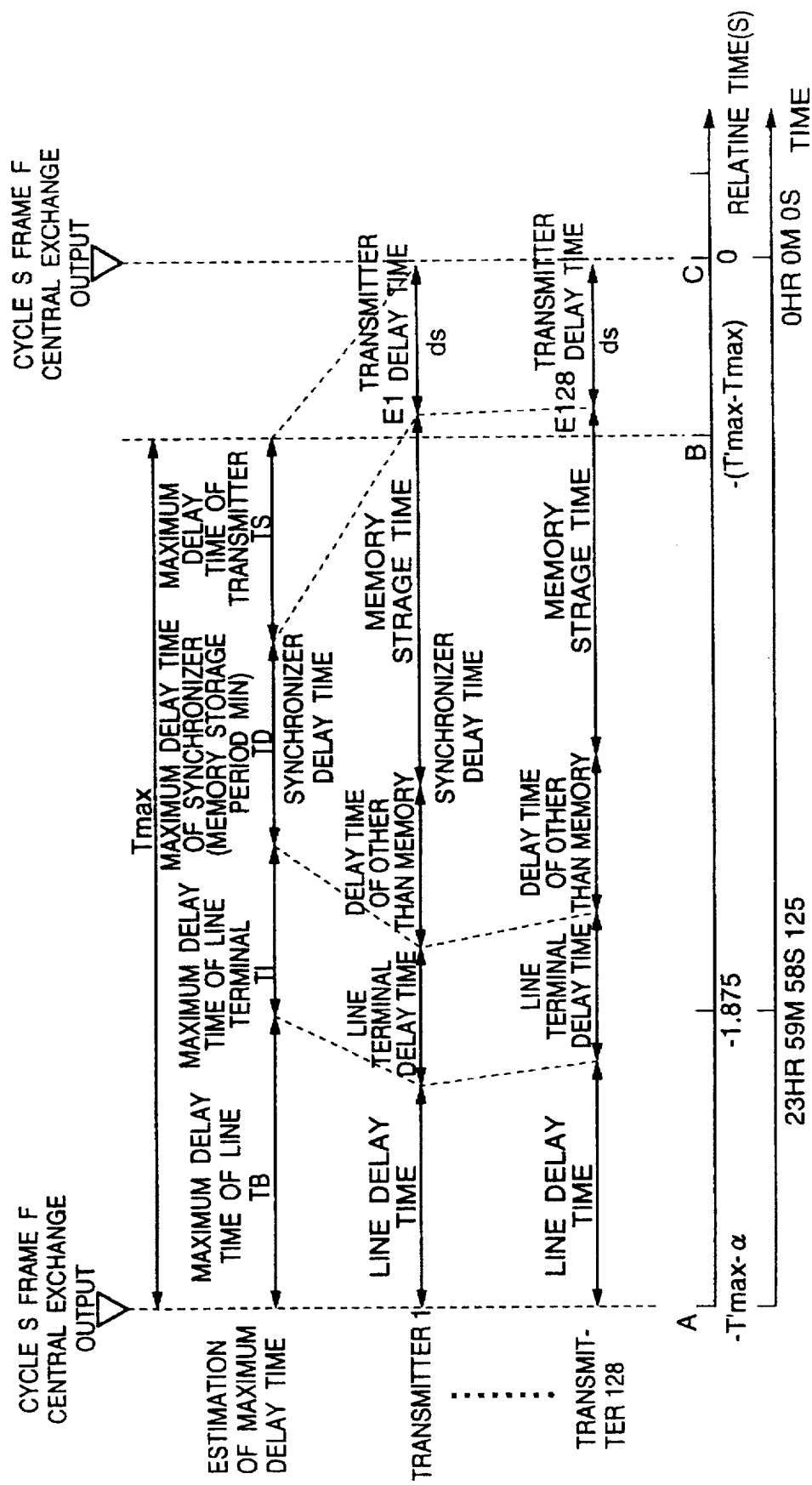
FIG. 23 is a diagram showing a process of air frame transmission in the embodiment according to the present invention.
Figure 24:
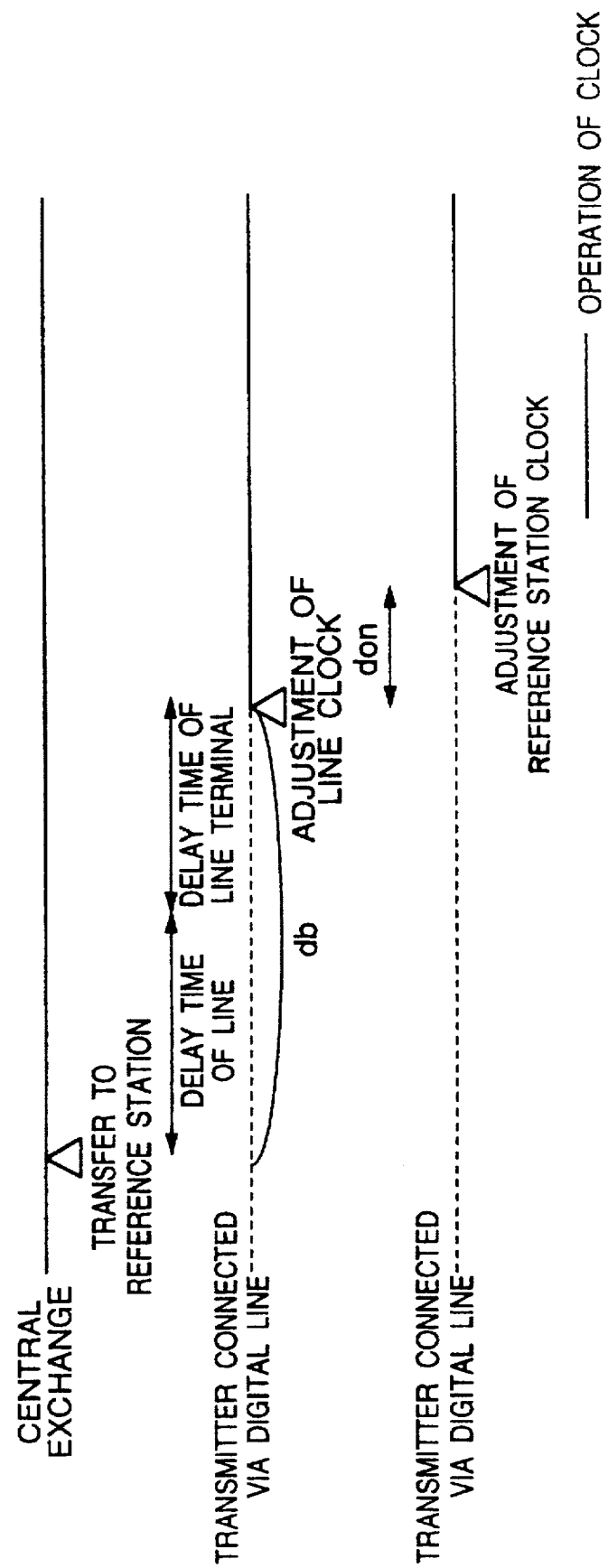
FIG. 24 is a diagram showing a method of obtaining time of delay in a line and a line terminal in the embodiment of the present invention.
Figure 25:
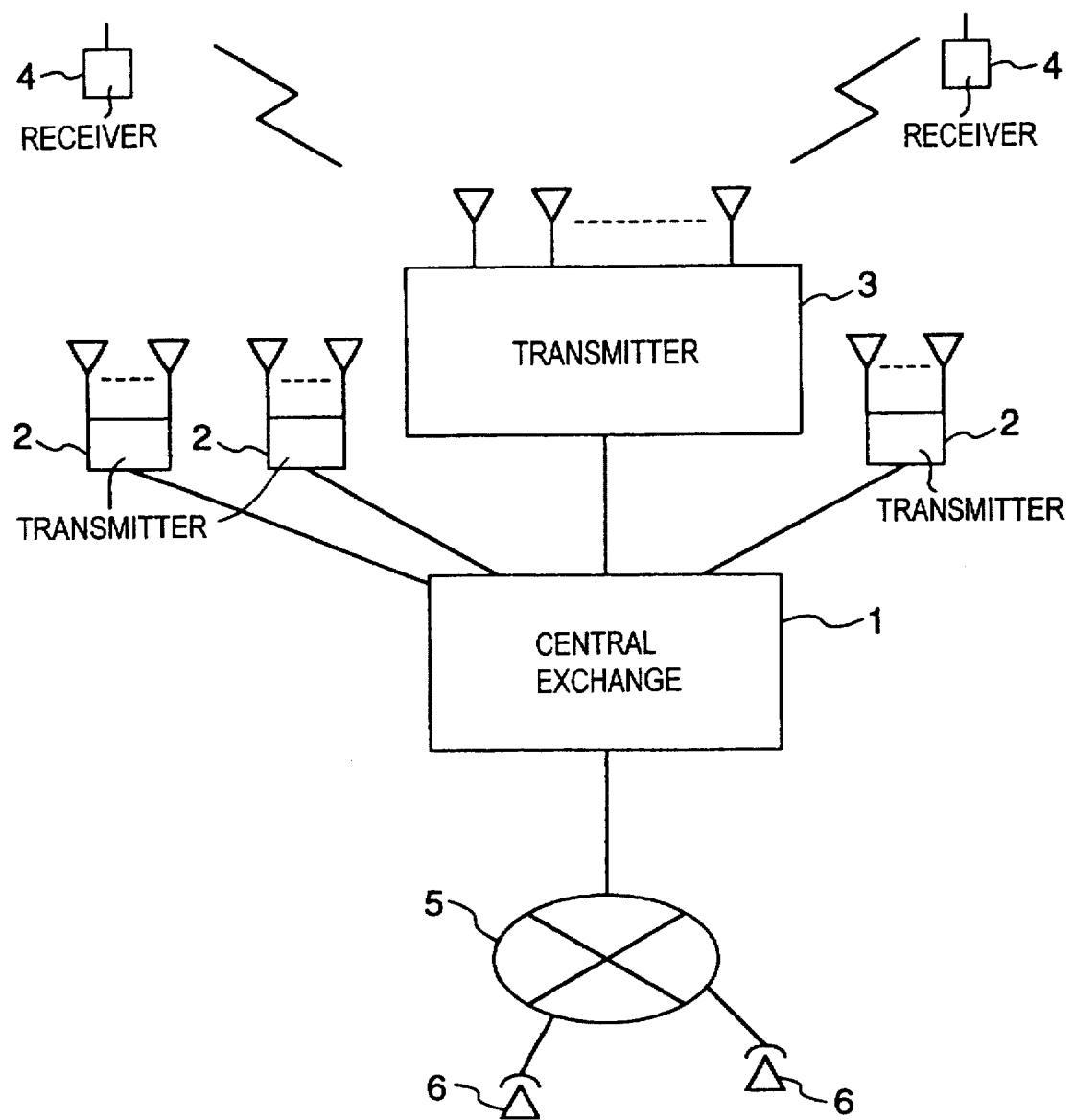
FIG. 25 is a block diagram showing the construction of a radio paging system of the prior art.

On the other hand, in the synchronizing section 21 of each transmitter 2, as can be seen from FIG. 23, when the time of the own GPS clock 1802 indicates a point of time which is earlier by dm obtained by the training than the real time of block information of the air frame once stored in the memory of the synchronizing unit as described above, the controller 1806 of the monitor controller 2107 supervises the synchronizing section 2107 to read the air frame from the memory and to send the air frame via the selector 1208 to the transmitting units 22. As a result, from each of the respective transmitters, there is sent an air frame having block information to which the same real time is set as shown in FIG. 23.

Incidentally, the GPS satellite is under supervision of the Department of Defense of the United States of America and hence it is not guaranteed that the current time is appropriately transmitted therefrom in any situation. To cope therewith, there is conducted the following failure detecting operation according to the embodiment. When it is assumed that the GPS satellite fails, the time control operation is accomplished according to the time of the central exchange in place of the GPS satellite. In addition, there may occur a case of failures in the respective sections of transmitters and lines. To overcome such difficulties, the following failure detection and countermeasure are provided in the embodiment. Moreover, for this purpose, the monitor controller 1213 of the central exchange 1 and the monitor controller 2107 of each transmitter 2 are respectively duplicated such that one of the duplicated controllers is employed as an ordinary unit (N) and the other one as a unit for errors (E) in the embodiment.

First, description will be given of the failure detection and countermeasure adopted in the embodiment.

The controller 1701 of the monitor controller 1213 of the central exchange 1 first intermittently initiates the encoder 1206 to create an air frame in which time is described as message information and to send the air frame via the line terminal 1210 (or 1211) to the transmitters 2 at a point of time described in the message information according to the GPS clock 1802 thereof. On the other hand, each of the transmitters 2 (including the reference and standby reference stations) linked via the dedicated or leased digital line to the central exchange 1 senses, in cooperation with the set of synchronizing units 2103, input timing of the frame to the synchronizing unit and obtains discrepancy between the time of the own GPS clock 1802 at the timing and that described in the message information of the air frame. The transmitter 2 memorizes the attained difference of time as the sum db of the delay time on the line between the central exchange 1 and the transmitter 2 and the delay time in the line terminals 2101 and 2102. However, it may also possible to set as the value of db a fixed value appropriately obtained.

Furthermore, the controller 1701 of the monitor controller 1213 of each of the reference and standby reference stations sends a test air frame having block information containing the real time from the transmitter transmitting unit 901 at the point of time indicated by the real time according to the own GPS clock 1802. In this case, according to the embodiment, the frequency bands used by the transmitter transmitting units 1901 of the reference and standby reference stations arranged in the same area are slightly shifted from each other such that either one of the signals respectively from the reference and standby reference stations can be selectively received by choosing a central frequency in each transmitter. However, for the reference and standby reference stations to send the test air frame at different points of timing, it may also be possible that each thereof transmits the air frame at predetermined timing such that each transmitter 2 selectively receives either one of the air frames respectively from the reference and standby reference stations according to the points of timing.

On the other hand, the monitor controller 1213 of each transmitter 2 receives the air frame by the reference station receiving unit 1805. The controller 1806 then compares the real time contained in block information of the received air frame with that of the own GPS clock 1802. When the difference of time is equal to or more than a predetermined value, the controller 1806 assumes that event a takes place. Moreover, the controller 1806 stores the discrepancy of time as the sum d0n of delay time t0 in the radio transmission from the reference station and delay time dn in the reference station receiving unit 1805.

Moreover, in the monitor controller 1213 of each transmitter, the air frame sent from the transmitter 2 associated therewith is received by the monitor receiving unit 1804. The controller 1806 then compares the real time in block information of the received air frame with that of own GPS clock 1802. When the discrepancy of time is equal to or more than a predetermined value, the controller 1806 assumes occurrence of event b.

In case where only event a has occurred, it is assumed that the reference station failed and hence the air frame received by the reference station receiving unit 1804 is replaced with one sent from the standby reference station. In the switching operation, it is only necessary to initiate an actuator integrated in the reference station receiving unit 1804 to adjust the direction of the reference station antenna of the reference station receiving unit 1804 ordinarily oriented to the the reference station to face the standby reference station (alternatively, to alter directivity of the antenna or to replace an antenna separatedly arranged for the standby reference station for the reference station antenna). Resultantly, the signal selectively received by the reference station antenna as described above is changed from the signal of the reference station to that of the standby reference station. If only event a also occurs even after the switching of signals, it is assumed that the reference station receiving unit 1805 failed such that the monitor controller 2107 currently in operation is replaced with a monitor controller for failure restoration.

On the other hand, when only event b occurs, it is assumed that the monitor receiving unit 1804 failed and hence the monitor controller 2107 currently in operation is replaced with a monitor controller for failure restoration. When only b occurs even after the replacement, the transmitting unit 22 is assumed to be in failure and then the following process is executed. That is, in the monitor controller 1213 of each transmitter 2, the air frame sent from the transmitting unit 22 thereof is monitored by the monitor receiving unit 1804. Thereafter, according to the transmission time determined by the cycle number, frame number, and real time in block information of the air frame which is sent from the transmitter 2 and is received by the synchronizing unit, if it is detected that the air frame is not received within the fixed period of time, the transmitting unit 22 specified to send the air frame is assumed to have failed, and hence the failed condition of the transmitting unit 22 is notified to the monitor controller 1213 of the central exchange 1.

On the other hand, when both of events a and b occur, the monitor receiving unit 1804 is assumed to be in failure and hence the monitor controller 2107 currently in operation is replaced with a monitor controller for failure restoration. If the event and event b occur at the same time even after the switching operation, the GPS satellite is assumed to have failed and then the condition is reported to the monitor controller 1213 of the central exchange 1.

Furthermore, in the monitor controller 1213 of each transmitter 2, a point of time obtained by subtracting TMAX described above from the transmission time of the frame decided by the cycle number, frame number, and real time in block information of the air frame which is sent from the transmitter 2 and is received by the synchronizing unit is compared with that of the GPS clock 1802 of the transmitter 2. If the time of the GPS clock 1802 is larger (later), event c is assumed to have taken place.

If event c occurs, it is considered that the line to the central exchange 1, the line terminal 2101 or 2102, or the set of synchronizing units 2103 has failed and hence the condition is notified to the monitor controller 1213 of the central exchange 1.

On the other hand, on receiving from the transmitter 2 the message of failure of the transmitting unit or the failure of the line, the line terminal 2101 or 2102, or the set of synchronizing units 1, the controller 1701 of the monitor controller 1213 of the central exchange 1 carries out a predetermined failure countermeasure process according to a predetermined procedure.

On the other hand, when the failure of the GPS satellite is reported from the transmitter 2, the controller 1701 of the monitor controller 1213 of the central exchange 1 accomplishes the following process.

That is, the controller 1701 of the monitor controller 1213 of the central exchange 1 first instructs each transmitter 2 to use the line clock 1803 or the reference station clock 2204 in place of the GPS clock 1802 of the transmitter 2.

Thereafter, the monitor controller 1213 of the central exchange 1 activates the encoder to send each air frame to the transmitter demultiplexer 1209 such that the air frame is sent to each transmitter 2 from the line terminal 1210 (or 1211) at a point of time which is earlier by TMAX described above than the time of transmission thereof from the transmitter 2 according to the time of the self-running clock 1702 in place of the GPS clock. In this regard, the self-running clock 1702 measures time, beginning at the time initially set thereto, in synchronism with the clock signal of a predetermined frequency extracted from the line to the switchboard 11. Furthermore, the self-running clock 1702 produces a reference clock signal synchronized with the clock signal of the predetermined frequency extracted from the line to the switchboard 11. Moreover, in this case, each section after the encoder on the transmitter side is operated with clock signals synchronized with the reference clock created from the self-running clock. Additionally, the encoder 1206 is intermittently activated to generate an air frame in which time is described as message information such that the air frame is sent from the line terminal 1210 (or 1211) at the time described as message information according to the time of the self-running clock 1702.

On the other hand, each of the transmitters (the reference and standby reference stations) 2 connected via the dedicated or leased digital line to the central exchange 1 is responsive to an instruction of usage of the line clock 1803 from the central exchange 1 to add the beforehand attained sum db of the delay time in the line between the central exchange 1 and the pertinent transmitter 2 and that of the line terminal 2101 or 2102 to the message information of the air frame intermittently sent from the central exchange 1, thereby setting the obtained time as the current time. When the current time is thus set, the line clock 1803 measures time in synchronism with the clock signal of the predetermined frequency extracted from the line to the central exchange 1. Thereafter, the monitor controller 2107 of the transmitter (as well as the reference station or standby reference station) 2 linked via the dedicated or leased digital line to the central exchange 1 controls the transmission time of the air frame by the line clock 1803 in place of the GPS clock.

Moreover, each of the reference and standby reference stations further sends from the transmitter 2 transmitting unit a test air frame containing the real time in the block information at a point of time indicated by the real time according to the line clock.

On the other hand, on receiving an indication of the utilization of the reference station clock 2204, the monitor controller 2107 of each transmitter 2 coupled via analog lines to the central exchange 1 adds by the controller 1806 the beforehand obtained sum d0n of delay time t0 of radio transmission from the reference station and delay time dn in the reference station receiving (unit) to the real time in block information of the test air frame received from the reference station by the reference station receiving unit, thereby setting the time as the current time to the reference station clock 2202. When the current time is set thereto, the reference station clock 2204 measures time in synchronism with clock components contained in the air frame received by the reference station receiving unit. After this point, the monitor controller 2107 of the transmitter (the reference station or the standby reference station) 2 controls the transmission time of the air frame by the reference station clock 2204 in place of the GPS clock.

Thanks to the above operation, without achieving any particular setting operation or the like in each transmitter, even when the GPS satellite is in failure, the air frame transmissions can be correctly synchronized with each other according to the delay time of each section obtained when the GPS satellite is normal.

Incidentally, more than one hundred transmitters 2 are connected to one central exchange 1 in general. In this situation, it is difficult for the central exchange 1 to manage and control states of the respective transmitters 2, which has been a cause of increase in the load on the central exchange 1.

To overcome this difficulty according to the embodiment, the monitor controller 1213 of the central exchange 1 controls the transmitters 2 in a polling method.

Assume that there are provided 128 transmitters 2. The transmitters 2 are classified into four 32-transmitter groups such that intra-group addresses are assigned to each of the transmitters 2 belonging to each group. Moreover, global addresses are also specified as addresses common to all transmitters 2. Additionally assigned to each transmitter 2 are addresses unique thereto.

In this situation, when actually conducting the control operation, the controller 1701 of the monitor controller 1213 of the central exchange 1 periodically sends a frame as a monitor control signal to each of the transmitters 2, the frame including a global address, an intra-group address, or an address unique to the transmitter designated in the leading field of a command. On the other hand, the controller of the monitor controller 2107 of each transmitter 2 executes, when the address of the frame thus received is a global address, an intra-group address assigned to the transmitter, or an address unique thereto, a process indicated by the command and then reports the result of execution as a monitor control signal to the central exchange 1 together with an address representing the transmitter 2. As the commands, there are provided an instruction to notify the state of the transmitter 2, an instruction to switch the system, an instruction to replace the clock described above, etc.

Incidentally, the report of the result of the command execution to each transmitter 2 may be implemented as follows. That is, according to the embodiment described above, the clocks of the central exchange 1 and respective transmitters 2 match each other with a high precision. Therefore, a zone of time to report the command execution result is beforehand allocated to each transmitter 2. According to the time of the clock valid at the point of time (GPS, line, or reference station clock), the monitor controller 2107 of the transmitter 2 notifies to the central exchange 1 the command execution results during the allocated time zone, the results being beforehand received. The monitor controller 1213 receives the execution result from the transmitter 2 according to the time of the clock valid at the point of time (GSP or self-running clock).

Thanks to the provision above, the handshaking operation between the central exchange 1 and each transmitter 2 can be dispensed with and hence the load is minimized. Moreover, even when the transmitter 2 is in a command execution disable state, the central exchange 1 can send a command in advance before the transmitter 2 is set to a command execution enable state. Additionally, the transmitter 2 beforehand recognizes a point of time to send a response to the command and hence can prepare a schedule of the command execution according to the time. Furthermore, the transmitter 2 can execute the command while the other transmitters 2 are sending responses to the central exchange 1. These facts facilitate reduction of the polling period.

Description has been given of the radio paging apparatus according to the embodiment.

Incidentally, each of the transmitters connected via dedicated or leased digital lines to the central exchange employes a line clock in the embodiments above. However, like the transmitters connected via analog lines to the central exchange, the transmitter other than the reference and standby reference stations may use the reference station clock in place of the line clock.

Moreover, although the time is received from the GPS satellite in the above embodiments, when there exists any satellite other than the GPS satellite to transmit the time, it may also be possible to use the satellite in place of the GPS satellite so as to receive and use the time sent therefrom.

According to the present invention described above, there can be provided a radio paging system capable of simply synchronizing all transmitters with each other with a satisfactory precision.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A radio paging system in which a message is transmitted to a plurality of receivers by radio, comprising:

a plurality of transmitters for transmitting the message by radio; and a central exchange connected to a network for distributing a message received from the network to the plural transmitters, the central exchange and each of the transmitters each including a satellite receiving unit for receiving information of time transmitted from a satellite by radio and a satellite clock for measuring a current time according to the information of time received by the satellite receiving unit, the central exchange further including means for adding, according to the current time being measured by the satellite clock thereof, transmission time information to the message received from the network, the information specifying a point of time at which the message is to be transmitted from the transmitter and distributing means for distributing to each of the transmitters the message to which the transmission time information is added, each of the transmitters including:

receiving means for receiving the message distributed from the central exchange, a receiver transmitting unit for transmitting a message by radio, a supervisory receiving unit for receiving a message transmitted from the receiver transmitting unit thereof, means for obtaining a transmission delay time of the receiver transmitting unit according to the difference between the time specified by the time information added to the message received by the supervisory receiving unit and the time, as measured by the satellite clock thereof, when the message is received by the supervisory receiving unit, and control means transmitting, according to the current time being measured by the satellite clock thereof, the message from the receiver transmitting unit at a point of time, adjusted by the obtained transmission delay time, specified by the time information added to the message received by the receiving means.

2. A transmitter apparatus for transmitting to a receiving unit by radio a message received from another transmitter at a point of time specified by time information added to the message, comprising:

a satellite receiving unit for receiving information of time transmitted from a satellite by radio;

a satellite clock for measuring a current time according to the information of time received by the satellite receiving unit;

receiving means for receiving the message transmitted from the other transmitter;

a receiver transmitting unit for transmitting a message by radio;

a supervisory receiving unit for receiving a message transmitted from the receiver transmitting unit;

means for obtaining a transmission delay time of the receiver transmitting unit according to the difference between the time specified by the time information added to the message received by the supervisory receiving unit and the time, as measured by the satellite clock thereof, when the message is received by the supervisory receiving unit, and control means transmitting, according to the current time being measured by the satellite clock thereof, the message from the receiver transmitting unit at a point of time, adjusted by the obtained transmission delay time, specified by the time information added to the message received by the receiving means.

3. A radio paging system in which a message received from a network is transmitted to a plurality of receivers by radio, comprising:

a plurality of transmitters for transmitting the message by radio; and a central exchange connected to the network and distributing the message received from the network to the plural transmitters, wherein the central exchange and each of the transmitters includes a satellite receiving unit for receiving information of time transmitted from a satellite by radio and a satellite clock for measuring a current time according to the information of time received by the satellite receiving unit;

the central exchange further including an encoder producing a test frame having a first specified time transmitted from the transmitters, and a first monitor controller for transmitting the test frame to the transmitters on the basis of the time of the satellite clock of the central exchange at a point of time earlier by estimated delay time TMAX occurring the process excluding the central exchange to the transmitter than the first specified time; and each of the transmitters further including:

a receiver for receiving the test frame from the central exchange, a radio transmitter for transmitting said test frame by radio at the first specified time included in the test frame received at the receiver on the basis of the time of the satellite clock of the transmitter, a radio receiver of the same transmitter for receiving the test frame transmitted by radio from the transmitting part of the same transmitter, and a second monitor controller for measuring the time of receiving the test frame in the radio receiver by means of the satellite clock of the transmitter and for obtaining a delay time dm by the radio transmitter from the time difference between the measured time and the first specified time included in the test frame;

the central exchange including distributing means for distributing the message received from the network to each of said transmitters at a point of time earlier by said estimated delay time TMAX than a second specified time transmitted from said transmitter; and in each of said transmitters the receiver receives the message distributed by the central exchange, and the second monitor controller transmits the received message to the radio transmitter before the delay time dm by the radio transmitter on the basis of the satellite clock of the transmitter.

* * * * *